United States Patent
Chavernac

(10) Patent No.: US 8,918,089 B2
(45) Date of Patent: Dec. 23, 2014

(54) METHOD AND DEVICE FOR VERIFYING PHYSICAL RECOGNITION BETWEEN A CALLER AND A CALLED PARTY

(75) Inventor: Pascal Chavernac, Carcassonne (FR)

(73) Assignee: Sigma Mediterranee, Carcassone (FR)

( * ) Notice: Subject to any disclaimer, the term of this patent is extended or adjusted under 35 U.S.C. 154(b) by 139 days.

(21) Appl. No.: 13/807,343

(22) PCT Filed: Jun. 28, 2011

(86) PCT No.: PCT/FR2011/051503
§ 371 (c)(1),
(2), (4) Date: Dec. 28, 2012

(87) PCT Pub. No.: WO2012/001295
PCT Pub. Date: Jan. 5, 2012

(65) Prior Publication Data
US 2013/0102297 A1    Apr. 25, 2013

(30) Foreign Application Priority Data
Jun. 28, 2010   (FR) ...................................... 10 55177

(51) Int. Cl.
*H04W 4/16*     (2009.01)
*H04M 1/64*     (2006.01)
*H04M 3/42*     (2006.01)
*H04L 12/66*    (2006.01)
*H04L 29/06*    (2006.01)
*G06F 21/31*    (2013.01)

(52) U.S. Cl.
CPC .............. *H04W 4/16* (2013.01); *H04L 63/0861* (2013.01); *G06F 21/31* (2013.01); *H04L 65/1076* (2013.01); *H04L 65/1096* (2013.01); *G06F 2221/2133* (2013.01); *H04L 65/1069* (2013.01); *H04L 63/083* (2013.01)

USPC ................... 455/415; 379/88.01; 379/201.01; 370/356

(58) Field of Classification Search
CPC . H04W 4/16; H04L 65/1076; H04L 65/1069; H04L 65/1096; H04L 63/0861
USPC ............ 455/415; 379/88.01, 201.01; 370/356
See application file for complete search history.

(56) References Cited

U.S. PATENT DOCUMENTS 7,486,779 B2 *   2/2009   Brown et al. ............... 379/88.02
2004/0066916 A1 *  4/2004   Brown et al. ............... 379/88.01

(Continued)

FOREIGN PATENT DOCUMENTS

EP          0 866 595 A2      9/1998

OTHER PUBLICATIONS

GX5 LLC, "DialByPhoto", Feb. 6, 2009, www.gx-5.com/products/dialbyphonetoiphone/index_full.php.

(Continued)

*Primary Examiner* — Meless Zewdu
*Assistant Examiner* — Jean Chang
(74) *Attorney, Agent, or Firm* — IM IP Law PLLC; C. Andrew IM

(57) ABSTRACT

The method of authorizing the transmission of a message comprises requesting the transmission of a message from a calling party to a called party and presenting a plurality of audiovisual media elements to the calling party, one of which is representative of a physical characteristic of the called party. The other audiovisual media elements are similar in form to the media element representative of the called party. The calling party selects one audiovisual media element from the presented media elements. The transmission of the message from the calling party to the called party is authorized only in the case where the selected audiovisual media element is representative of the called party.

20 Claims, 21 Drawing Sheets

(56) References Cited

U.S. PATENT DOCUMENTS

| | | |
|---|---|---|
| 2006/0074685 A1* | 4/2006 | Brown et al. .................. 704/273 |
| 2007/0121596 A1* | 5/2007 | Kurapati et al. .............. 370/356 |
| 2007/0165811 A1* | 7/2007 | Reumann et al. ........ 379/201.01 |
| 2007/0283142 A1 | 12/2007 | Milstein et al. |
| 2008/0209223 A1 | 8/2008 | Nandy et al. |
| 2009/0046839 A1* | 2/2009 | Chow et al. .............. 379/142.01 |
| 2009/0164645 A1* | 6/2009 | Sylvain ......................... 709/228 |

OTHER PUBLICATIONS

GX5 LLC, DialByPhoto for iPhone on the iTunes App Store, Feb. 6, 2009, http://itunes.apple.com/app/dialbyphoto/id302676474?mt=8.

* cited by examiner

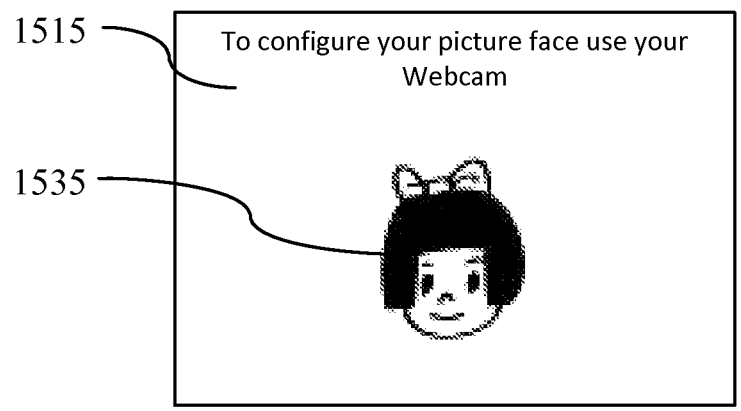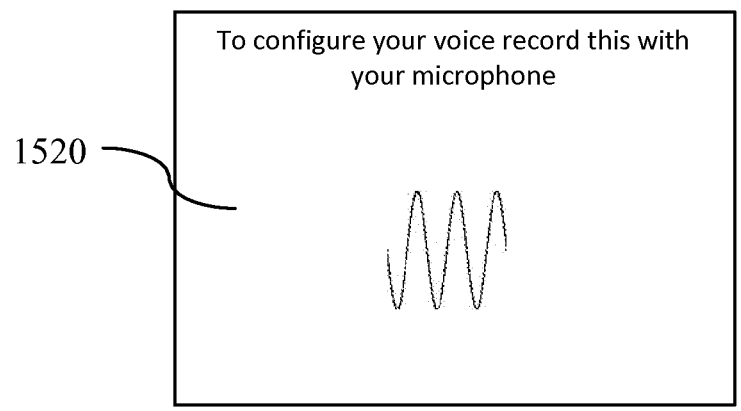
Figure 15

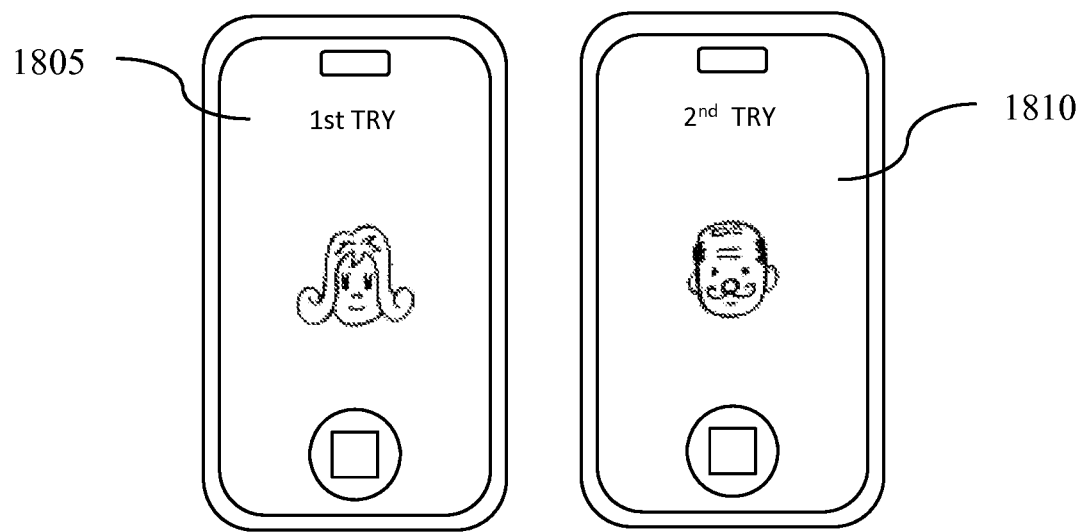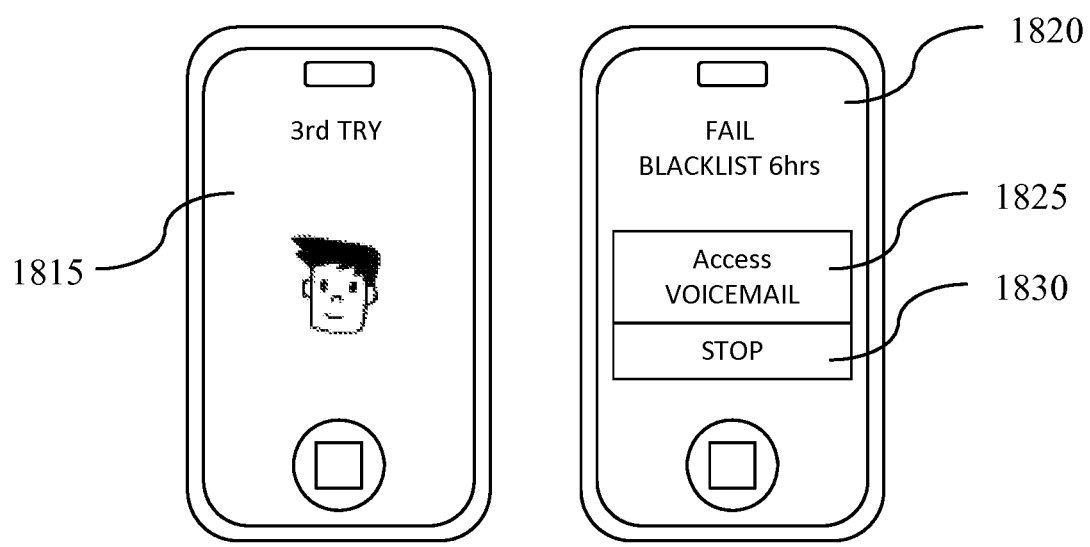
Figure 18

METHOD AND DEVICE FOR VERIFYING PHYSICAL RECOGNITION BETWEEN A CALLER AND A CALLED PARTY

RELATED APPLICATIONS

This application is a §371 application from PCT/FR2011/051503 filed Jun. 28, 2011, which claims priority from French Patent Application No. 10 55177 filed Jun. 28, 2010, 2010, each of which is incorporated herein by reference in its entirety.

BACKGROUND OF THE INVENTION

This invention relates to a method and a device for physical verification and recognition between a calling party and a called party. It makes it possible to verify the existence of prior personal contacts before being connected. This authentication of a calling party is in particular intended for audio-visual communications by people with no knowledge of information technology and/or who do not have a computer. This invention also relates to a system for checking the connection identity between two people, irrespective of the technical means used for the connection.

There are many systems that allow at least two users, at a distance from each other, to communicate and exchange during a voice, video and/or text conversation. Many websites and Internet communications systems allow computer users to organize videoconferences by means of a digital camera, called "webcam", a microphone or similar peripherals connected to these users' computers. All these instant messaging systems share the drawback of requiring the use of a computer for each user who wants to communicate with another user. These communications techniques are therefore not suitable for elderly persons or for people who have difficulties in using computers.

Using the conventional telephone network is also known as a way of realizing a video and voice conversation between several users. In this case, the various users who wish to take part in the conversation need only be equipped with relatively sophisticated telephones comprising a built-in camera and microphone and to perform the steps required by the telephone service provider to have access to this service.

One of the drawbacks of videoconference systems utilizing telephony networks is that it incurs a non-negligible cost to the calling party, compared to videoconferencing based on Internet technologies.

In any communications system, there is also the risk that third parties will send unsolicited messages, commonly called "spam" or "junk mail", which, after having become a nuisance to e-mail users, are now expanding to the use of short messages ("SMS"), of telephony and of videotelephony.

Document US 2008209223 is known; as stated in its paragraph 1, it relates to the access security of a computer environment and more specifically to generating a visual recognition question to check that the user is a human being. The purpose of this document is therefore to prevent an automated system ("robot" or "bot") from accessing a resource over the Internet. More specifically, this is about preventing optical character recognition from reading the glyphs in a frame whose position is known (see paragraph 39). In this security system, users are shown a single image, which represents a sequence of symbols (e.g. a secret code shared between the user and the authorization server) that has been distorted and placed in a variable position on a background, then the users are asked to recognize these symbols (see FIGS. 5 to 7, 11 and 14 to 20).

Traditionally, access to a resource or to a person is based on:
- what the entity trying to gain access is:
  - biometrics are used to recognize it automatically, which implies complex, expensive and low-reliability systems or
  - requesting the person to whom access is requested to recognize it by transmitting its image or voice, which implies disturbing this person;
- what the entity trying to gain access has in its possession, i.e. a physical medium or key, mechanical or electronic or
- what the entity trying to gain access knows: it must agree a password with the person it wishes to have access to, which implies tediously remembering it.

Thus, none of the traditional access authorization methods is suitable either for filtering out calls between relatives or for use by young children, elderly persons or persons with impaired faculties.

The document "DialByPhoto" by Tunji Afonja, (internet URL: http://www.gx-5.com/products/dialbyphotoforiphone/index_full.php, is known: it describes a means of selecting contacts based on their photograph. This device does not guarantee that the calling party knows the called party, i.e. is able to physically identify the called party. In particular, this system allows unsolicited calls to be made by using telephone numbers. In addition, randomly associating photos to telephone numbers to be called allows unsolicited calls to be made. For example, during a telephone prospection campaign, the absence of a relation between a photo and a telephone number does not change the operation of the system and does not makes it possible to protect the called parties from these unsolicited calls.

SUMMARY OF THE INVENTION

This invention aims to remedy all or part of these drawbacks.

To this end, according to a first aspect, this invention envisages a method as described in claim 1.

Thanks to these provisions, only a person who knows the called party, their photograph or voice can identify them and consequently authenticate themselves as a legitimate calling party.

In the embodiment of this invention in which images are utilized, the calling party is shown a plurality of undistorted photographs and this calling party designates the called party's photograph with a single mouse click.

Implementing this invention makes it possible for the calling party to certify that they know the called party physically before being connected. In this way, this invention slows the growth in undesirable contacts, telephone annoyances, spam, junk mail and scams, irrespective of the means of communication used, by only allowing a calling party to be connected once they have been able to physically identify the called party.

According to particular features the step of requesting a message to be transmitted comprises a step of requesting a password from the calling party; the presentation step is only performed if the calling party does not supply the expected password.

According to particular features, if the media element selected by the calling party represents the called party, a password is supplied to the calling party.

Thanks to each of these provisions, a calling party to whom a password has been sent and who is therefore a user authorized to call the called party, can avoid the called party's prior recognition procedure.

According to particular features, if the media element selected by the calling party represents the called party, a unique address for the calling party is stored on a network linking the calling party to the called party; the calling party can then make calls to the called party by utilizing said unique address without the presentation and selection steps being utilized.

The stored address is, for example, a fixed IP address or a telephone line number. Thanks to these provisions, the calling party who has previously recognized the called party does not need to recognize them each time the calling party wants to contact the called party.

According to particular features, each unique address used by the called party to call another user is stored; the calling party can then make calls to the called party by utilizing said unique address without the presentation and selection steps being utilized.

Thanks to these provisions, the contacts that the called party has tried to call are automatically authorized to contact the called party without having to perform the prior called party recognition.

According to particular features, at least one said media element is a fixed image, undistorted following said image's capture, said image representing the called party's face and/or an object that is a regular part of their surroundings.

According to particular features, at least one said media element is a video sequence, undistorted following said sequence's capture, said sequence representing the called party's face and/or an object that is a regular part of their surroundings.

Thanks to each of these provisions, visual, therefore very fast, recognition is realized.

According to particular features, at least one said media element is an audio media element representing the called party's voice, undistorted following the capture of said voice.

Thanks to these provisions, any telephone can be utilized to contact the called party.

According to particular features, the method that is the subject of the invention comprises in addition a step in which the called party supplies said media element.

Thanks to these provisions, the called parties themselves supply the images or sound and/or visual recordings that will be used to recognize them.

According to particular features, a plurality of media elements representing the called party are stored in memory and, during the presentation step, if the calling party has not selected the media element representing the called party in the previous message transmission request, the media element representing the called party is a different media element from that presented to the calling party at the time of the previous message transmission request.

Thanks to these provisions, those who make unsolicited calls cannot obtain any useful information from the previous failed attempt.

According to particular features, the method that is the subject of the invention comprises in addition a step of picking random other media elements from a database to constitute said plurality of media elements to be presented during the presentation step.

Thanks to these provisions, the media elements are different for different called parties, limiting the information obtained from a failed attempt.

According to particular features, the message transmission step comprises a step of detecting the image display capability of the calling means used by the calling party and:
- if the calling means can display images, media elements comprising at least one image are presented during the presentation step and
- if the calling means cannot display images, audio media elements are presented during the presentation step.

According to particular features, during the step of detecting the image display capability, the IMEI (International Mobile Equipment Identity) of the calling means used by the calling party is utilized.

Thanks to each of these provisions, the media type is selected automatically according to the capabilities of the calling means.

According to particular features, where the calling party does not select the media element representing the called party after a predefined number of consecutive attempts, the calling party is connected to a voicemail of the called party.

Thanks to these provisions, the calling party can leave a message, even when they are not authorized to contact the called party directly.

According to a second aspect, this invention envisages a system for authorizing a transmission of a message. The system comprises a processing unit associated with a called part, a user device and a server. The user device is utilized by a calling party to select an identifier of a called party and to request the transmission of a message to the processing unit of the called party over a communications network. The server verifies that the calling party is able to recognize the called party from one of a plurality of identifiers selected by the called party. The server presents a plurality of audiovisual media elements on the user device of the calling party. One of the plurality of audiovisual media elements being representative of a physical characteristic of the called party. Other audiovisual media elements of the plurality of the audiovisual media elements being similar in form to the audiovisual media element representative of the called party. The user device receives one audiovisual media element selected by the calling party from the audiovisual media elements presented on the user device. The server authorizes the transmission of the message to the processing unit of the called party from the user device of the calling party when the selected audiovisual media element is representative of the called party. The server denies the request to transmit the message to the processing unit of the called party from the user device of the calling party when the selected audiovisual media element is not representative of the called party.

As the particular characteristics, advantages and aims of this device are similar to those of the method that is the subject of this invention, as described in brief above, they are not repeated here.

BRIEF DESCRIPTION OF THE DRAWINGS

Other advantages, aims and characteristics of the present invention will become apparent from the description that will follow, made, as an example that is in no way limiting, with reference to the drawings included in an appendix, in which:

FIG. 15 represents, schematically, user interfaces for computers, residential gateways and public terminals for a called party to supply an undistorted media element representing a physical characteristic of the user;

FIG. 18 represents, schematically, interfaces for when a calling party fails to visually recognize a called party;

DETAILED DESCRIPTION OF THE EMBODIMENTS

The terms "calling party" and "called party" are used for all types of contact and for all types of communications: telephone, SMS, e-mail, videotelephony, etc.

"Called party biometrics" refers to any physical characteristic, in particular voice or face, which makes it possible to confirm that the calling party has physically recognized the called party.

In the description, two physical characteristics are utilized as examples:
recognition of a photo of the called party and
recognition of the voice of the called party.

Figure 1:
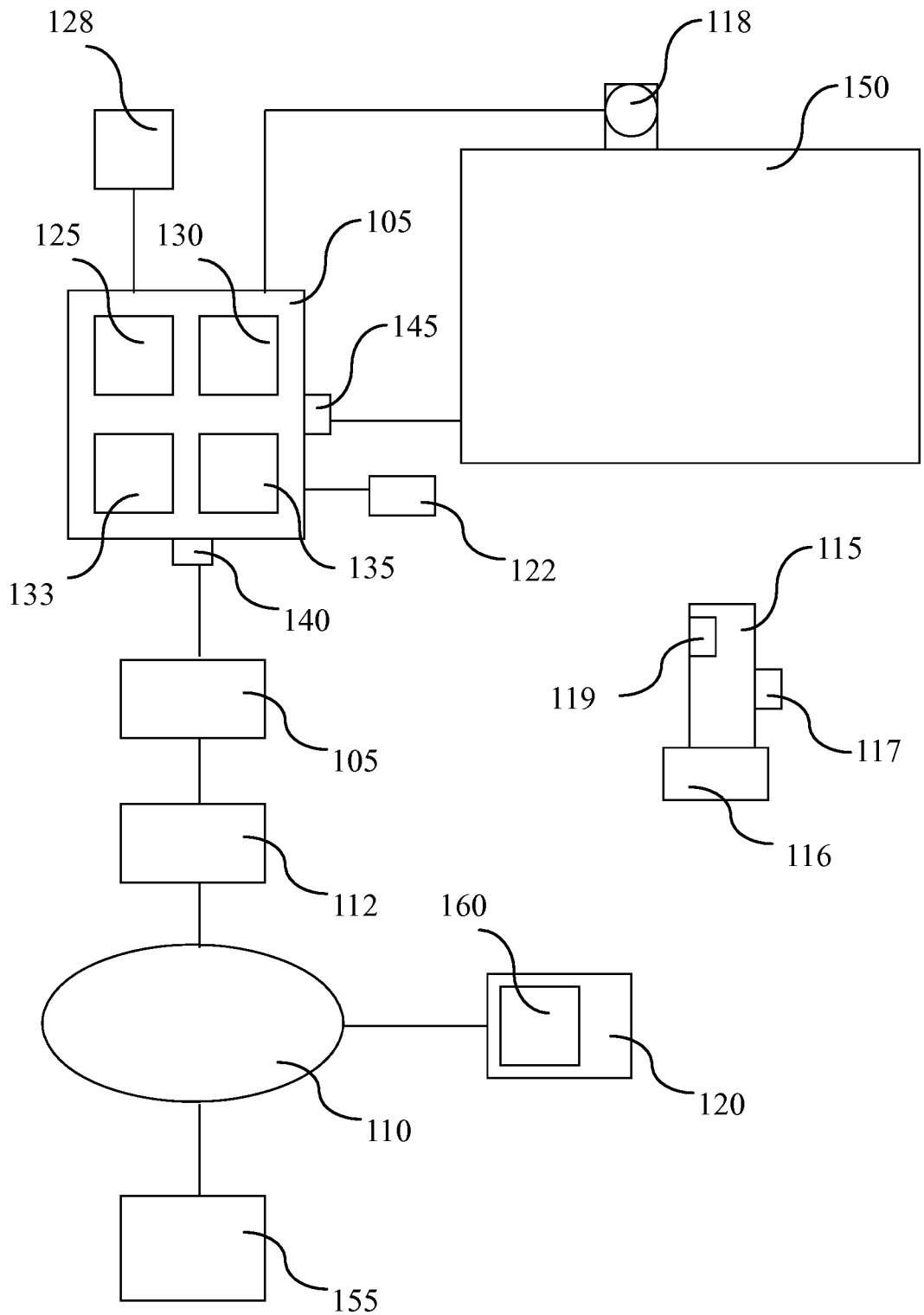
FIG. 1 represents, schematically, a communications unit utilized in embodiments of this invention.

FIG. 1 illustrates schematically an implementation of this invention that comprises, firstly a unit 105 connected to a computer network 110, e.g. the Internet, by means of a modem (often called "home gateway") 112. Each unit has an address on the network 110, e.g. a dynamic and unique IP ("internet protocol") address. Each unit is associated to at least one remote control 115 that allows this unit to be controlled from a short distance away (typically a few meters away), preferably by radio frequency communication.

A set of servers, jointly called "central server" 120 is also connected to the network 110. The central server 120 is used by various units 105 and by remote computer terminals 155, which communicate periodically with one or another of these units 105.

Each unit 105 comprises the means required for it to operate, in particular: an electric power supply 125; a stand-alone data processing unit 130; a non-volatile data storage unit 135, e.g. a hard disk or flash memory components; a connector 140 to link the unit 105 to the modem 112; a connector 145 to link the unit 105 to a television 150 and a loudspeaker 133. Each unit is also associated with at least one digital camera 118, an ambient microphone 122 and possibly sensors 128, in particular in the case of the extension of its applicability to telemedicine and/or remote monitoring.

Preferably, the unit 105 is made of the main components and circuits of a computer; its remote control 115 is in fact a cordless keyboard and its screen is the television 150. In the remainder of the description, this cordless keyboard is called "remote control" because of its ergonomics, suitable for being held in one hand to press a few keys. In other words, the remote control 115 constitutes a cordless digital keyboard emulator that sends codes, e.g. ASCII (American Standard Code for Information Interchange). Thanks to this characteristic, no driver is required for the central processing unit of the unit 105, which is based on the architecture of general-purpose computers, e.g. PC ("personal computer"), to process the commands transmitted by the remote control. The computer/unit 105 then only listens out for the codes transmitted by its keyboard/remote control 115. For example, a Flash Player (registered trademark) program listens out for keyboard events.

The unit 105 is a product designed in particular for elderly or hospitalized persons. It is a unit connected to one of its user's televisions, which makes it possible to communicate with their surroundings by means of the digital camera 118 and at least one microphone. Its users see on their television screen 150 and discuss life with their family and friends, wherever they may be in the world, with no time limit. Elderly persons therefore benefit from a social and emotional bond. To remove any difficulty of use, all commands go through the remote control 115, which is very simple, with large color keys whose colors match colored areas and messages displayed on the television screen 150. Using the television screen 150 as the interface makes it easier for the elderly to adopt this product, as televisions are already a part of their lifestyle, unlike touch-screen computers, for example.

Other functions, described below, allow messages, hypertext links and media elements (photos, audio and audiovisual) to be transmitted to the user of the unit 105 and to capture medical events or conditions regarding this user or safety conditions of the premises in which the unit 105 is located.

The unit 105 makes it possible, in different embodiments, to use one or more of the following modules:

"Telemedicine" Module:

The relatives or staff can access, subject to their being authorized, certain items of information regarding the state of the elderly person's health and can be warned if the system detects abnormalities. The physical data captured may comprise: temperature, pulse, blood pressure, position in space (i.e. lying down, sitting, standing position), hydration, food, atmospheric conditions in the user's environment.

The telemedicine module utilizes dedicated sensors 128 to acquire medical information regarding the user. It transmits the medical items of information to the physician, allows the user to communicate with healthcare personnel, allows the healthcare personnel to set the parameters of the module with the user (defines measures to be taken, information to be shared, etc.), alerts the rescue services or relatives in case the user's health is poor. Among the sensors specific to the telemedicine module, the following can be cited: a Bluetooth (registered trademark) sphygmomanometer, Bluetooth scales, a wireless oxymetry sensor, a wireless glucose meter and a wireless multifunction medical belt. The data items captured may comprise: cardiac rhythm; respiratory rhythm;

respiratory amplitude; skin temperature; position of the user's body (standing, face on the ground, on the back, on the side, upside down, etc.); level of activity (not active, light activity, intensive activity) and shock detection.

"Geolocation" Module:

The relatives or healthcare personnel are alerted when an elderly person goes outside a predefined perimeter or shows abnormal behavior.

"Home Automation" Module:

The system detects abnormalities (gas leaks, leak detection, temperature detector, electrical consumption meter, smoke detection, outside door opened, presence detector, triggering a siren, etc.) in the user's environment and alerts the user and those relatives allowed access to this type of information. This module also makes possible simplified management of the house (fully or partly automated).

The home automation module consists of installing measurement sensors 128 to monitor the condition of the user's home and possibly actuators to automate it, simplify the user's life and, if necessary, to monitor the user for their own safety (for people with mental impairments, such as Alzheimer's disease).

Starting up the sensors and actuator can be achieved by plugging into an electric outlet or by inserting batteries for the others.

The alarm system operates in real time (SMS, MMS, e-mail, Voice call, Fax).

"Interactive Image Capture" Module:

The users take videos/photos of their surroundings with a mobile camera and the resulting media elements are immediately made available for visualizing by their relatives in each user's own virtual space.

The unit 105 provides a common hardware base for the modules (processor, memory storage space, connections, etc.)

The remote control 115, shown in FIG. 1 inserted into a base unit 116, which possibly supplies power to it, comprises in particular a switch 117 and a microphone 119. The remote control 115 only comprises the microphone 119, but no loudspeaker. The remote control is then able to transmit to the unit 105 a signal representing the sound captured by this microphone 119. Preferably, an echo cancellation process is applied to the captured signal. In effect, if the remote contact uses an ambient microphone, a disagreeable echo effect may occur because the microphone 119 in the remote control 115 also operates as an ambient microphone.

The switch 117, which is preferably located on the back of the remote control 115, causes the microphone 119 to operate when this switch 117 is pressed. In embodiments, the switch 117 then also causes the ambient microphone 122 to stop operating.

In this way, as soon as the user puts the remote control 115 down on a flat surface, or presses this switch 117 while holding the remote control, sound is captured closer to them than if it were captured by the ambient microphone 122.

Preferably, the sound signal coming from the remote contact is emitted by a loudspeaker 133 separate from that in the television, to allow the user of the unit 105 to hear the sound of the television program they are watching even when there is an incoming call on the unit 105.

Therefore, in embodiments, this invention utilizes a remote communication device that comprises:

at least one fixed unit comprising at least one loudspeaker and means of remotely controlling the operation of at least one said loudspeaker, where said remote control means only comprise a microphone and means of transmitting to at least one said unit a signal representing a signal emitted by said microphone.

The user is therefore not encouraged to place the remote control means near their ear but, on the contrary, to hold it in their hands, pressed up against a base or to put it down on such a base. Consequently, the microphone is in the vicinity of the user and does not require them to raise their voice. In addition, this avoids the user tiring their arms and having to wear a headset.

It should be noted that the loudspeaker utilized in these embodiments can be that of the unit 105 or of the television 150, controlled by the unit 105.

The switch 117 makes it possible to use the remote control 115 "hands-free" by triggering the operation of the microphone 119 and the echo cancellation of the signal provided by this microphone 119. Consequently, it is located preferably on the back of the remote control 115.

In embodiments, a means of calling all the user's contacts is added to the unit 105, operating when an alarm button (not shown) is selected on the remote control and/or on the unit 105.

In embodiments, a means of detecting that the user has fallen is added to the unit 105; such a detection requests all the contacts to be called. The fall detection can, for example, use: voice or noise recognition; an accelerometer built into the remote control; a unit worn by the user; or image processing of the images captured by the camera 118 associated with the unit 105.

The user controls the unit 105 with the remote control 115. To change from their TV program to displaying the signal emitted by the unit 105, they must press the AV button ("Audio/video" or "auxiliary") on the television remote control.

Since the unit 105 has to connect to the various servers of the central server 120, all the connections and flows are secure. For this purpose, the following, for example, are utilized:

the "SSL" layer (Transport Layer Security (TLS), previously called Secure Sockets Layer (SSL), is a protocol for securing exchanges over the Internet) and a pair of public/private keys for the machines to authenticate each other.

The unit 105 starts up automatically and logs in the Linux user automatically. The unit 105 stays switched on permanently.

When the unit 105 connects to the server 120 it behaves as a thin client. Via DHCP ("Dynamic Host Configuration Protocol"—a network protocol designed to automatically configure a workstation's IP parameters, in particular by automatically assigning an IP address and subnet mask to it. DHCP can also configure the address of the default gateway, the DNS domain name servers), the server is assigned an address.

At the time of installation, the start page of the Internet browser (Firefox, Internet Explorer, etc. registered trademarks) is specified (i.e. the electronic address or "URL" of the video server of the central server 120) and a certificate is imported.

Figure 4:
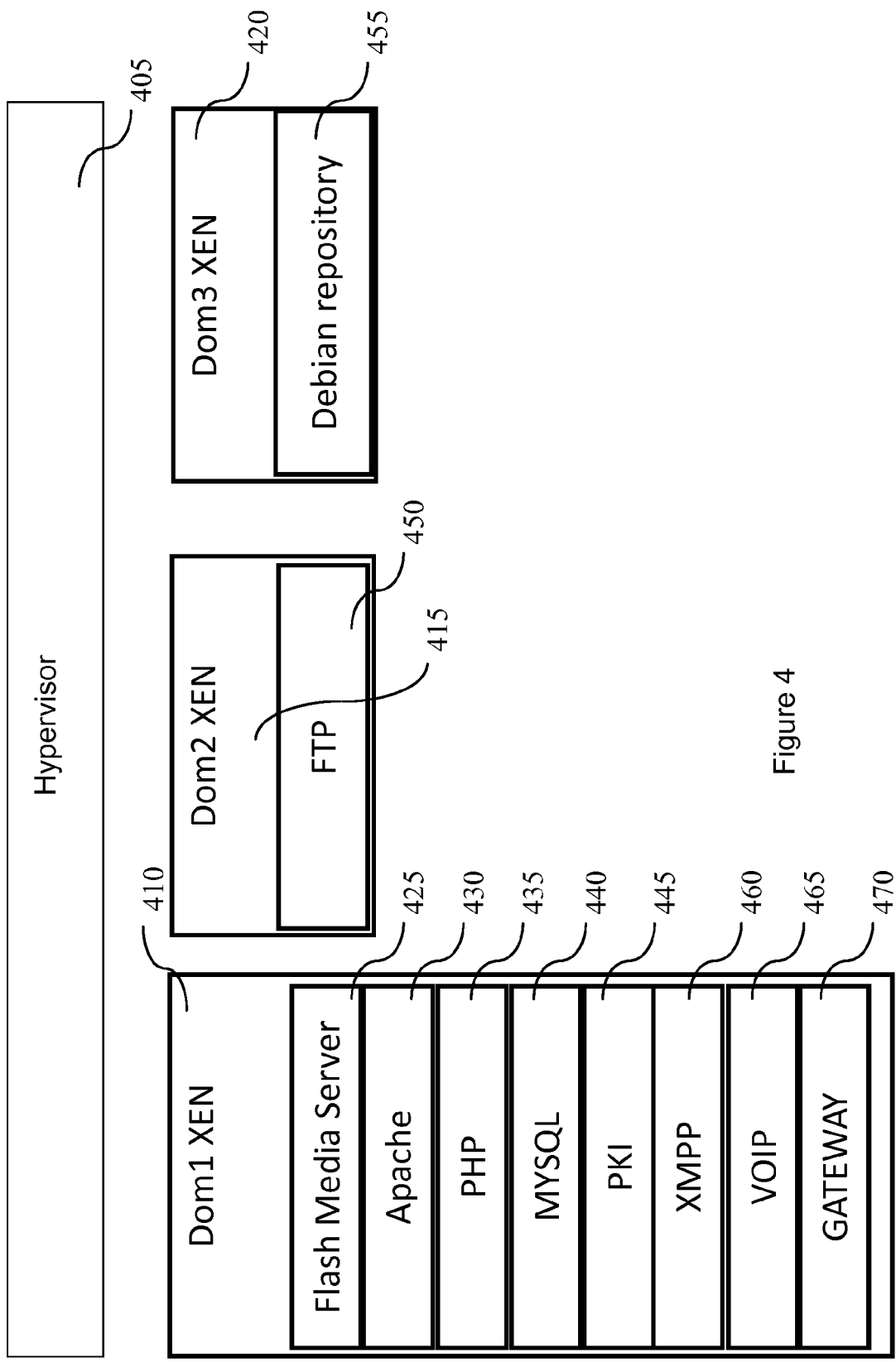
FIG. 4 represents, schematically, servers utilized in embodiments of this invention.

Even though the term "central server" 120 can physically designate a single server, preferably, the central server 120 comprises of a plurality of servers designed to communicate among themselves, which comprise, as illustrated in FIG. 4:

a hypervisor 405;

a streaming server 425 that makes it possible, among other things, to stream the video streams to make them available to the various clients (e.g. the RedS free open source server or a Flash media server); this server manages:

the connected clients;
interactions between the clients;
stream management (real time or recorded); and
running update scripts on the units;

The P2P server 425 ("peer-to-peer") that also allows UDP streams to be set up between clients to make the streams from the streaming server easily accessible.

a web server 430 (e.g. of Apache type) that makes it possible to access information via a published website;

a security server 430 that makes it possible, among other things, to secure transmissions over the network by encrypting the data;

a database server 440 that makes it possible, amongst others things, to manage all of the systems' databases;

a certification authority management server 445 that makes it possible, amongst others, to create and deliver, for each unit, a unique certificate which is automatically integrated therein;

an FTP server 450 ("File Transfer Protocol", a communications protocol designed for exchanging files between computers over a TCP/IP network; From a computer, it allows files to be copied to another computer on the network, to update a website and to delete or modify files on that computer.

a Debian repository server 455 (Debian is an operating system based exclusively on open source software, which allows a unification mode for many elements, which are developed independently from each other, for several hardware architectures and in relation to several software kernels; These packages are associated as "packages" that can be modified depending on choices and requirements);

an XMPP server 460 (e.g. an OpenFire-type server) that makes it possible, amongst others, to exchange files, on-line gaming and real-time notifications;

a VoIP server 465 ("Voice over IP"), e.g. the open source free Asterisk server which makes it possible, amongst others, to interface the telephone network to the central web server's network and/or a gateway server 470 which makes it possible, among others, to establish a link to a third-party management platform, e.g. telemedicine or remote monitoring.

As illustrated in FIG. 4, these virtual servers, whose operations are supervised by the hypervisor 405, can be assembled into three servers 410, 415 and 420.

The administration server 120 for all of the units 105 allows the following tasks to be performed, among others:
updating the units 105;
checking the availability of the units 105;
centralizing the logs; and
remotely controlling the units 105.

In this way the server 120 preferably uses a secure communications protocol, e.g. HTTPS ("HyperText Transfer Protocol Secure"). The connection between a unit 105 and a computer 155 is secured thanks, for example, to an OpenSSL server (registered trademark) that the server 120 comprises. To this end, each unit 105 is configured beforehand, i.e. a unique identifier and password are associated with each of the computers 155 that are authorized to communicate with each of the units 105. These items of information are stored in a database 160, utilizing e.g. MySQL (registered trademark) integrated in the server 120. Registration of the identification of the various computers is performed with a network management interface that is remotely accessible and configurable by a computer connected to the network 110. Access to this network interface is protected by the identifier assigned to the unit 105 and by the password associated therewith.

Preferably, the central server 120 includes SIP ("Session Initiation Protocol", a multimedia protocol that enables, for example, voice over an IP network).

The flash interface is stored on the central server 120. However, while the unit 105 is being configured, remote communications are generally not functioning. To solve this problem, a web server (not shown) is installed and configured on the unit 105 as a localhost. Its purpose is to allow the unit 105 to be configured.

The entire configuration of the unit 105, together with its storage, is centralized firstly on the central server 120 and secondly on the local server. The configuration and the local site are stored in flash memory in the unit 105, as well as the commands that enable communications with the central server 120.

Personalization is performed and stored remotely from the unit 105, making restorations and updates easier.

Figure 2:
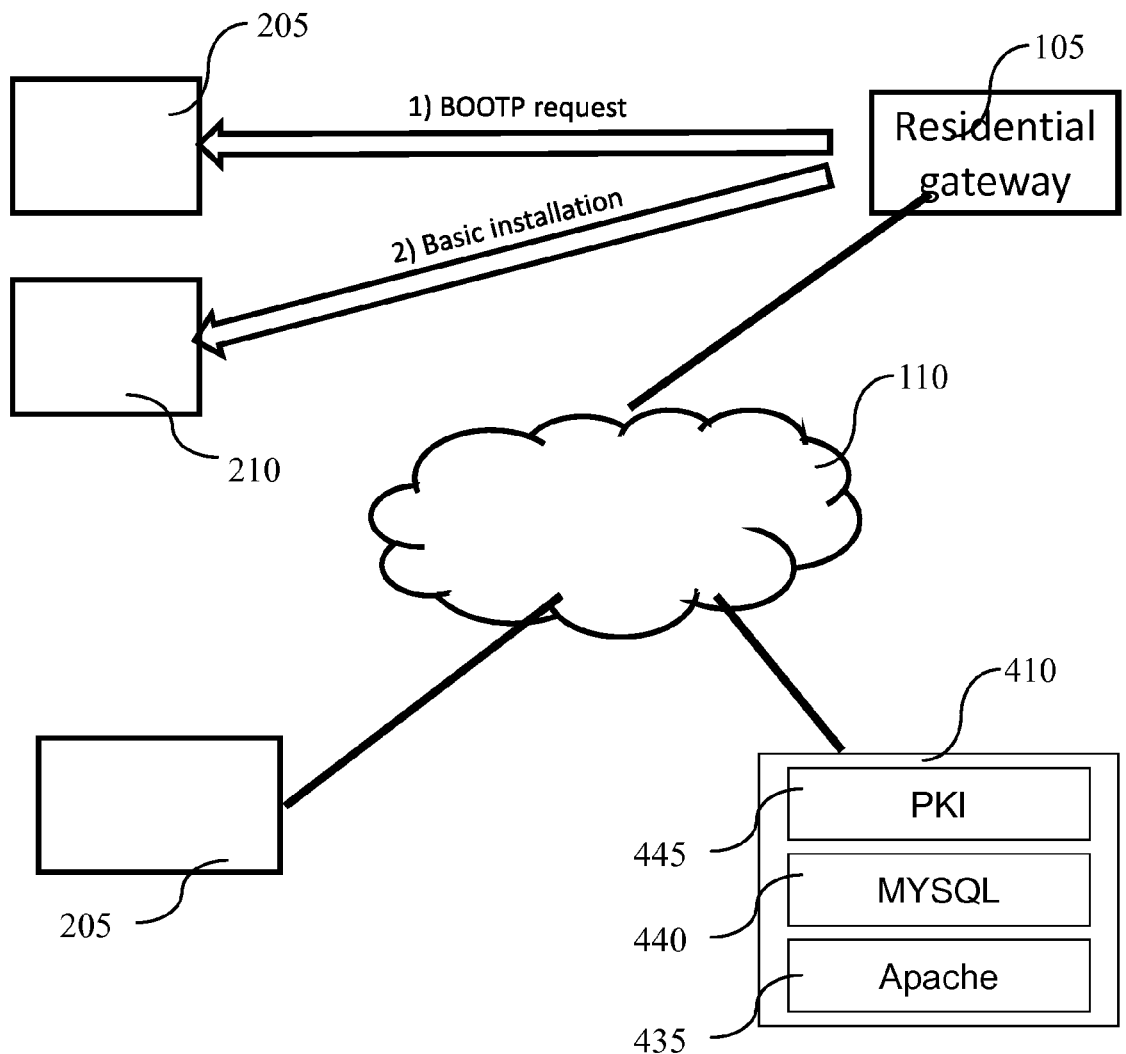
FIG. 2 is a functional diagram utilized for installing a unit in embodiments of this invention.

As illustrated in FIG. 2, to install the unit 105, it is plugged into the local installation server 205; the BIOS ("Basic Input Output System") of the unit 105 is accessed to allow a LAN boot, i.e. a network boot (see Bootp, FIG. 2).

To generate a unique key for each unit 105, during the unit's installation, the MAC address of the unit 105 is used to obtain a PKI ("Public Key Infrastructure") certificate from the PKI server 445.

This certificate, generated and installed by the unit 105 is integrated in the unit's browser.

This certificate is then used to realize a passive identification at each connection between the unit and the server. The unit then sets up an encrypted tunnel and the server takes control. All the communications are then encrypted using, for example, the https protocol ("secure hypertext transfer protocol"). In this way, taking control is performed without port forwarding or opening ports or parameterization of replicated servers. In addition, a user's unit 105 can easily be changed in this way.

Then comes the upgrade stage, with the installation of a "package" that allows the standard distribution to be modified and to change it via the update server.

This stage comprises integrating the security and authentication systems such that:
a routine for automatically importing a user-level security certificate with a passphrase into a browser (key=MAC address of the VNDBoxTV).
exchanging RSA keys for linking the update server and the SSH server.

The autologin phase then occurs without prompt.

VNDBoxTV updates are automated. At each start-up, the installed version is compared to the current version stored in the update server (via the flash stack, PHP, MySQL) If they are not the same, the update is launched.

Each system updates itself separately, but it is possible to launch a global update for a number of units.

Figure 11:
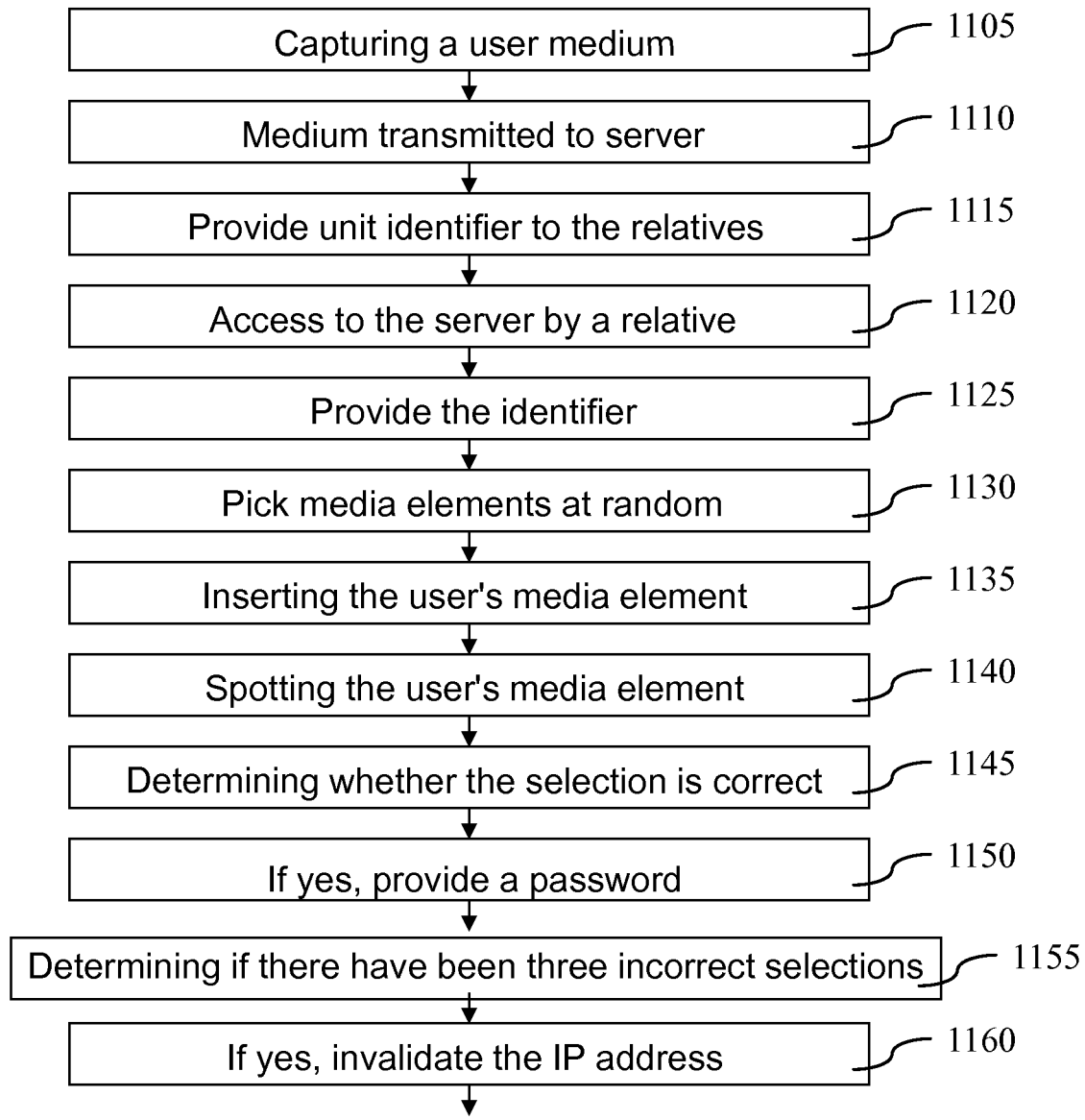
FIG. 11 represents, in the form of a logical diagram, steps utilized for registering a contact of a unit's user.

For contacts to be able to communicate, preferably, the user of the unit is required to take a photo of themselves or of their surroundings, or to record their voice, or to film themselves (step 1105 in FIG. 11). In general, an audiovisual media element representing the user is constituted in this way, so that they can be called. This media element is transmitted to the central server 120 in a step 1110.

It should be noted that the user may change this media element at any time.

For relatives to be able to identify themselves to the central server 120 and to communicate with the user of the unit 105, this user supplies to these relatives the internet address of a site hosted on the central server 120 and a number (unique identifier) printed on the unit 105 in a step 1115.

When these relatives (also called "contacts" in the rest of the description) want to be able to communicate with the user, they access, using a computer terminal 155, typically a computer, the site hosted on the long-distance computer network's server (step 1120). They then supply an identifier of the user of the unit 105 or of the unit 105 (step 1125).

In a step 1135, the server then presents to this relative a page containing a photograph of the user of the unit 105 and many other photographs selected at random (step 1130) from a database of photographs that possibly comprises photographs of other users. In a text message, this page requests the contact to click on the photograph if the user of the unit 105.

To authenticate themselves, the contact must then click on the photograph of the user of the unit 105 during a step 1140. If the selection matches the photograph supplied by the user, as determined in a step 1145, the contact obtains a password, for example transmitted by e-mail or by minimessage in a step 1150. Possibly, the contact also obtains, during this step 1150, a login, if the latter is not an identifier they already know, e.g. their e-mail address. If the selection is negative, the contact is requested again to click on the user's photograph, by going back to step 1135. If an incorrect selection is made three times in a row, which is determined in a step 1155, the network address of the computer 155 is invalidated and stored as such in a database of invalid addresses kept by the server in a step 1160.

Generally, in particular when it is not a photograph that is taken by the user of the unit 105, to authenticate the calling party, they identify the called party and select an audiovisual media element representing the called party among a plurality of media elements. The other presented media elements are picked randomly from a media database. The central server 120 validates the calling party's identifier as being authorized to call to the user of the unit 105 only if the media element selected by the caller matches the called party. In this way, only a person who knows the called party, their photograph or voice can identify them and consequently be authenticated as a legitimate calling party.

Thanks to the utilization of this authentication procedure, "spam" (unsolicited communications from third-parties) is prevented from reaching the user. Invalidated addresses may be unblocked after a predefined period of time or by the manager of the site hosted by the server.

In variants, authentication by checking the calling party's recognition of a media element representing the called party is performed for every call made by the calling party.

It should be noted that this aspect of this invention is not limited to the use of a communications unit: on the contrary, it extends to any communications system, in particular to fixed or mobile telephony and to the transmission of e-mails and minimessages.

The various functions of the unit 105 will now be described.

In regards to remote control, this invention utilizes preferably a remote control system without port forwarding for the units.

It should be noted that in variants, only the video stream is transported according to a peer-to-peer (or "P2P") protocol, but the rest of the communications transit via the server (where it is possibly stored), allowing gains in latency.

The simplest function is receiving a call made by a relative. Initially, the unit 105 is in sleep mode. When a computer 155 attempts to connect to the unit 105 using the server 120, a PHP script checks by querying the database 160 that this computer 155 has been previously stored in this database 160 and that the identifier and password it has sent are those associated with the unit 105.

Two Scenarios Arise:
the calling computer 155 is not recognized, either because it is not registered in the database 160 or because the identifier and/or password entered by the user of the computer 155 on the server 120 are incorrect; in this case, the connection procedure between the computer 155 and the unit 105 stops and therefore no communication is possible between the computer 155 and the unit 105;

the computer 155 is recognized; In this case, the unit 105 indicates to its user, visually by displaying and/or audibly by emitting an audible signal through the loudspeaker 133, that an incoming call is waiting.

If the television 150 is not switched on, it must be switched on and the auxiliary input selected. Then, the remote control 115 makes it possible to accept or refuse the call. There are therefore two possible options:
either the user of the unit 105 rejects the call, by means of a remote control associated with the unit 105, in which case the connection between the computer 155 and the unit 105 is stopped;

or the user of the unit 105 accepts the call, in which case, the video broadcast emitted by a webcam connected to the computer and the sound emitted by a microphone connected to this same computer are activated, i.e., the images received by the unit 105 are displayed on the television to which the unit 105 is connected and the sound is emitted over the loudspeaker built into the unit 105.

Figure 5:
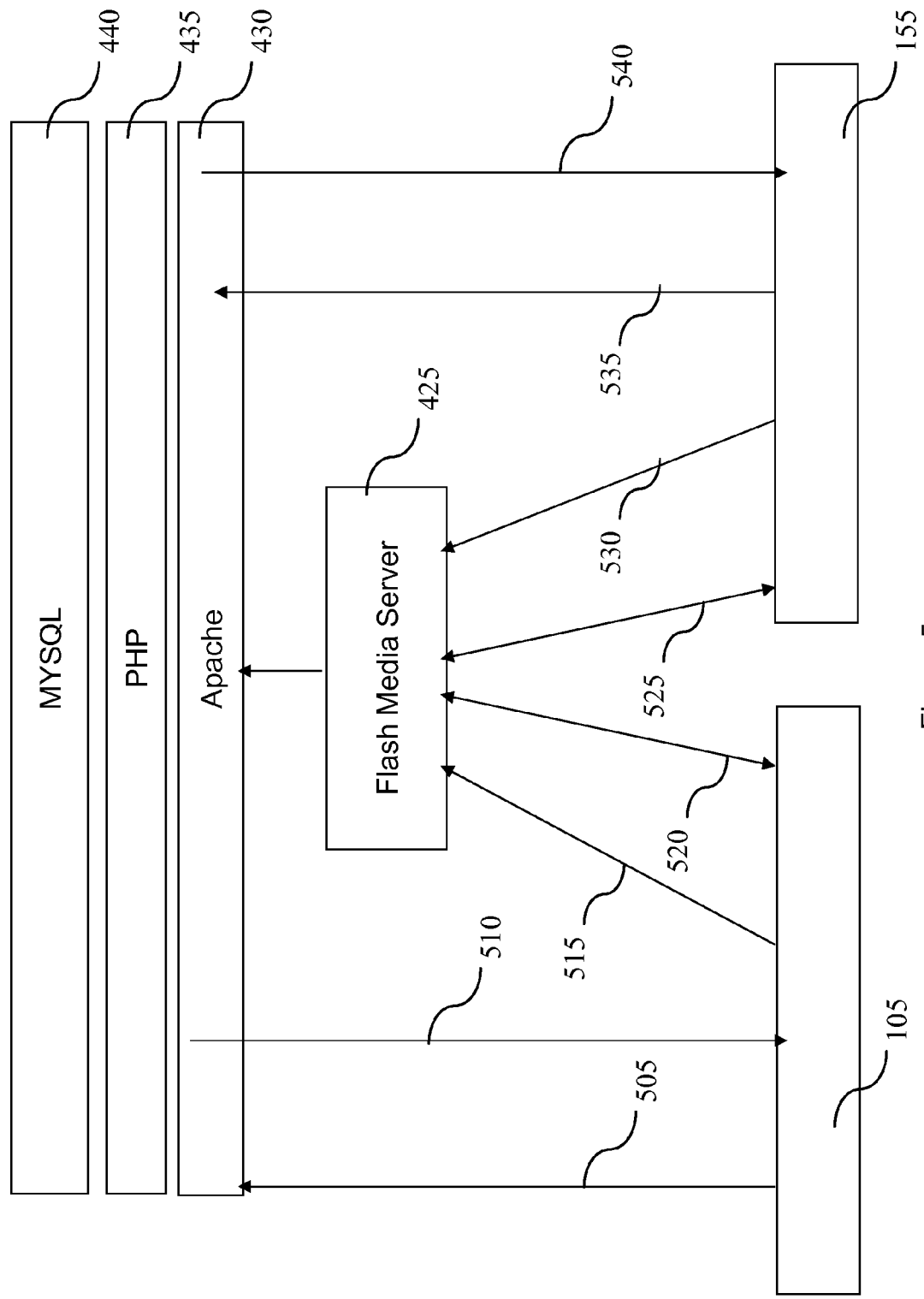
FIGS. 5 and 6 are schematics of data exchanges utilized to connect a unit and a remote computer terminal in embodiments of this invention.
Figure 6:
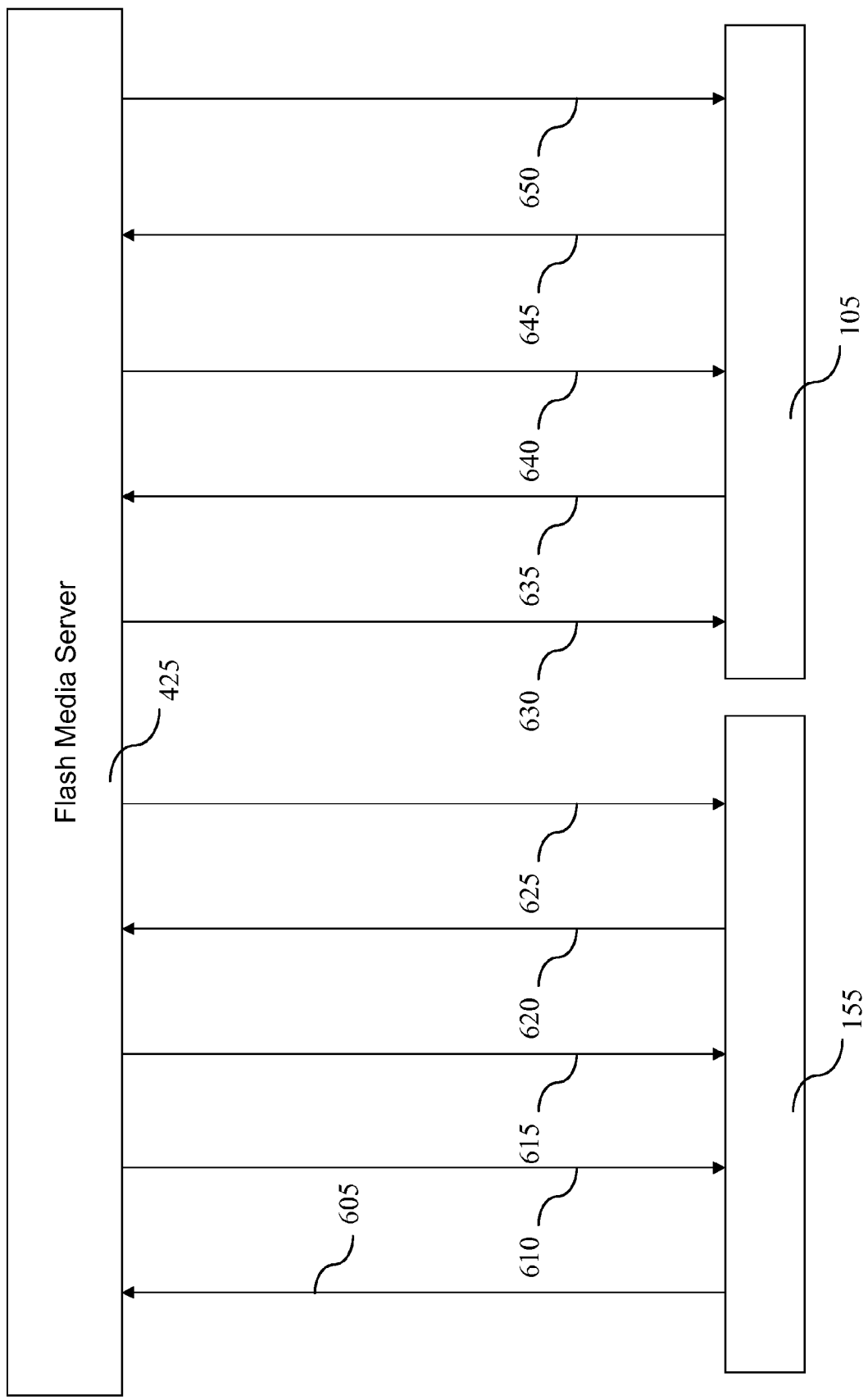

FIGS. 5 and 6 illustrate these steps.

The unit 105 transmits a key to the servers 430, 435 and 440 in the exchange of messages 505. It receives, in an exchange of messages 510, a unique identifier for connecting to the FMS server 425. An exchange of messages 515 allows it to connect to the FMS server 425, which checks the unique identifier of the unit 105 to this end.

An exchange of messages 520 makes it possible to measure the available bandwidth, the achievable video data throughput and the video quality that corresponds thereto, at the unit 105.

At the computer 155, an exchange of messages 525 allows the computer 155 to connect to the servers 430, 435 and 440. An exchange of messages 530 makes it possible for the computer 155 to retrieve a unique identifier for connecting to the FMS server 425. An exchange of messages 535 allows the computer 155 to connect to the FMS server 425, which verifies the unique identifier of the computer 155 to this end.

An exchange of messages 540 makes it possible to measure the available bandwidth, the achievable video data throughput and the video quality that corresponds thereto, at the computer 155.

Once the connections to the FMS server 425 have been performed by the unit 105 and the computer 155, as illustrated in FIG. 6, the computer 155 makes a call by supplying the identifier of the unit 105 in an exchange of messages 605. It receives a response from the FMS server 425 in a message exchange 610 and connection information in an exchange of messages 615. The computer 155 then performs the emission of video signals in exchanges of messages 620 and the reception of video signals in exchanges of messages 625.

In parallel, the FMS server 425 sends a call prompt to the unit 105 in an exchange of messages 630. It receives a response in an exchange of messages 635. It provides connection information to the unit 105 in an exchange of messages 640. The unit 105 then performs the emission of video signals in exchanges of messages 645 and the reception of video signals in exchanges of messages 650.

In this way, during the communication step, if the camera connected to the unit 105 and the microphone built into this unit 105 are activated, video and sound are also transmitted in reciprocal manner to the computer 155 with which the unit 105 is communicating.

If any one whatsoever of the users of the unit 105 or of the computer decides to terminate the connection, respectively with the remote control associated with the unit 105 or if the user of the computer 155 disconnects from the web server, the connection is stopped simultaneously.

During the communication, the screen of the television 150 displays simultaneously the images of the contact and of the user.

For the user to contact one of their relatives, they must press a key on the remote control and choose the one they want to contact from the contacts authorized by the central server 120.

Figure 7:
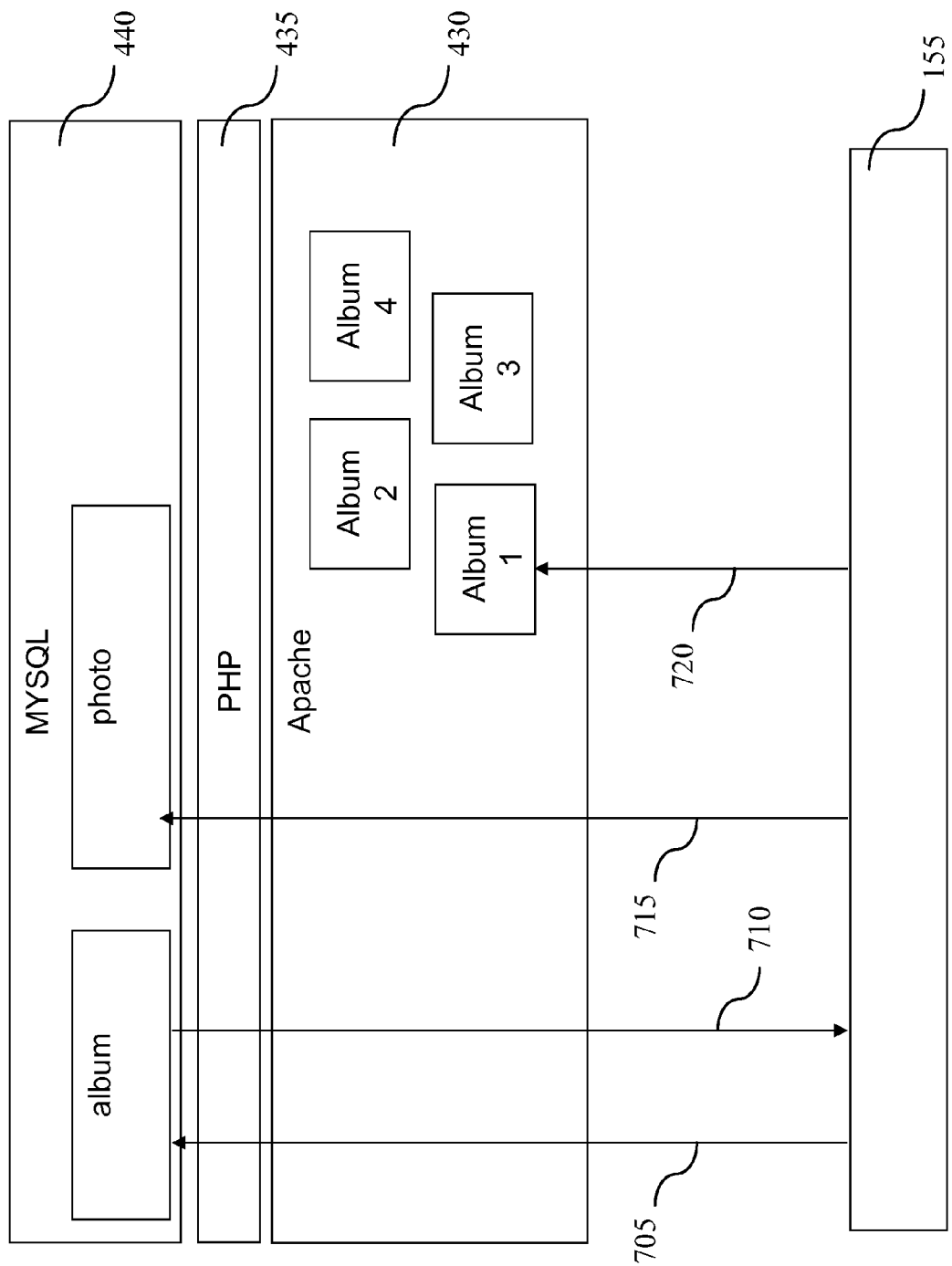
FIGS. 7 and 8 are schematics of data exchanges utilized for connecting a unit and a remote computer terminal in embodiments of this invention.

The remote contact can transmit photos to the user of the unit 105. FIG. 7 illustrates sending photos by the computer 155 for sharing with the user of the unit 105.

In an exchange of messages 705 with the server 440, using the servers 430 and 435, the computer 155 transmits an identifier of an album (a folder of photo files) selected by its user. In an exchange of messages 710, the computer 155 retrieves the contents of the selected folder. After editing this folder, the computer 155 performs the recording of the folder in the database of the server 440, in an exchange of messages 715. In an exchange of messages 720, the computer 155 uploads the photo files into the albums kept by the server 430.

Figure 8:
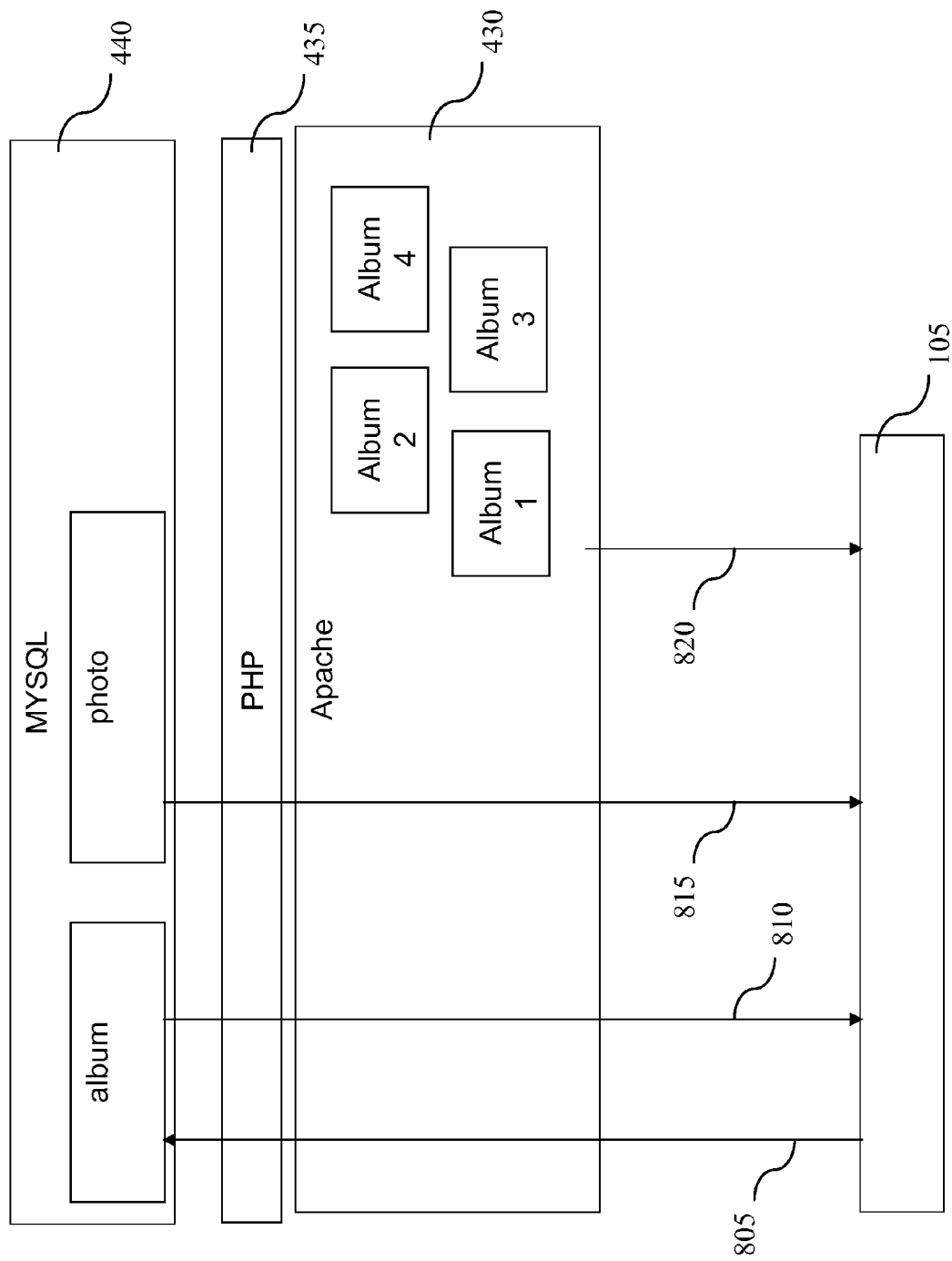

FIG. 8 illustrates photos being received by the unit 105. In an exchange of messages 805 with the server 440, using the servers 430 and 435, the unit 105 transmits an identifier of an album (a folder of photo files) selected by its user. In an exchange of messages 810, the unit 105 retrieves the description of the selected folder. In an exchange of messages 815, the unit 105 receives the database record from the server 440. In an exchange of messages 820, the unit 105 downloads the photos in the albums kept by the server 430.

Figure 9:
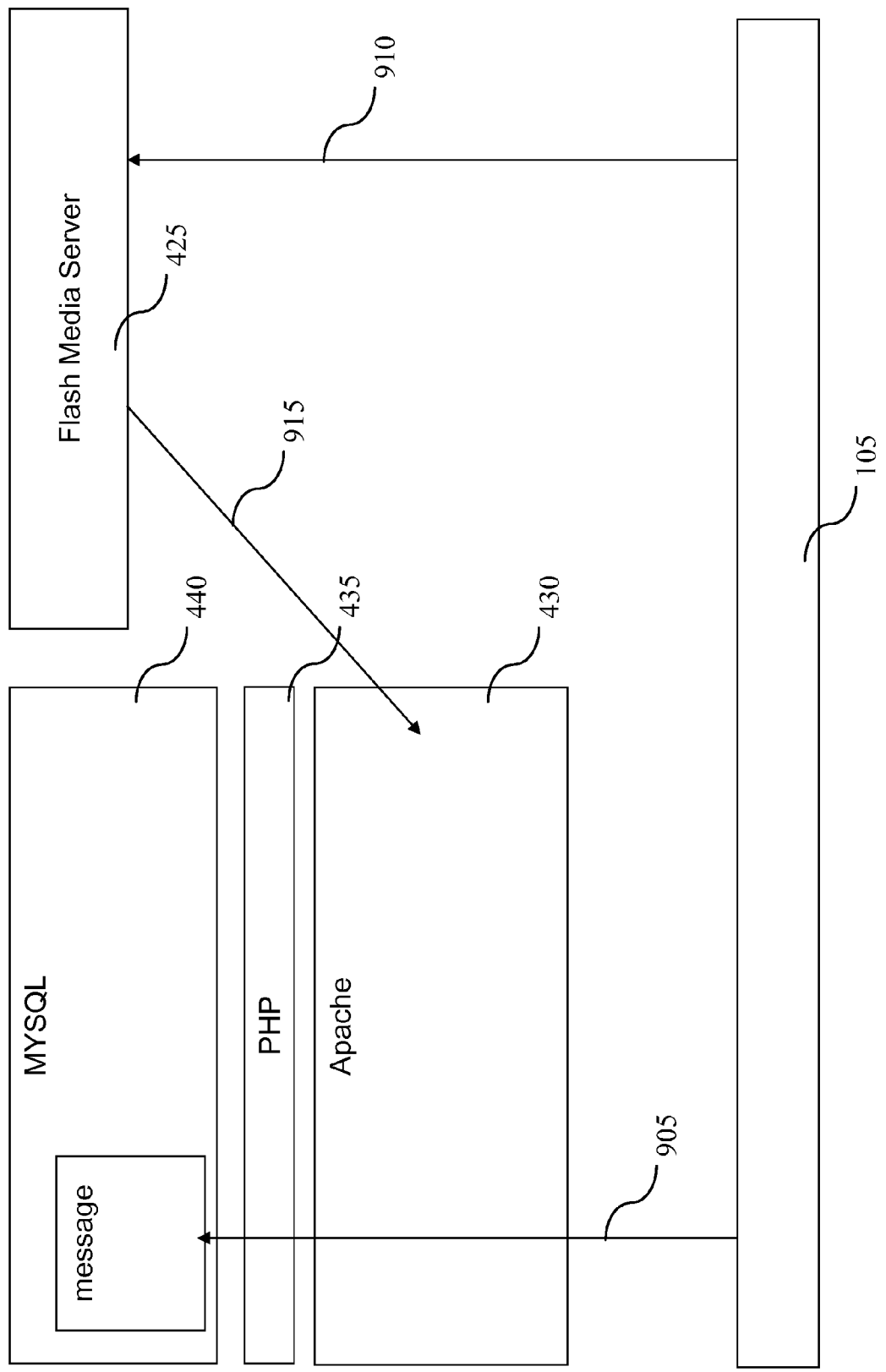
FIGS. 9 and 10 are schematics of data exchanges utilized for transmitting messages between a remote computer terminal and a unit in embodiments of this invention.

The calling party, i.e. the remote party or the user of the unit 105 here, can leave a video message to the called party by recording it. FIG. 9 illustrates steps of sending such a message.

In an exchange of messages 905, the computer 155 connects with the server 440 using the servers 430 and 435. In an exchange of messages 910, the computer 155 transmits the message file to the server 425. In an exchange of messages 915, the server 425 records the message file in the server 430.

Figure 10:
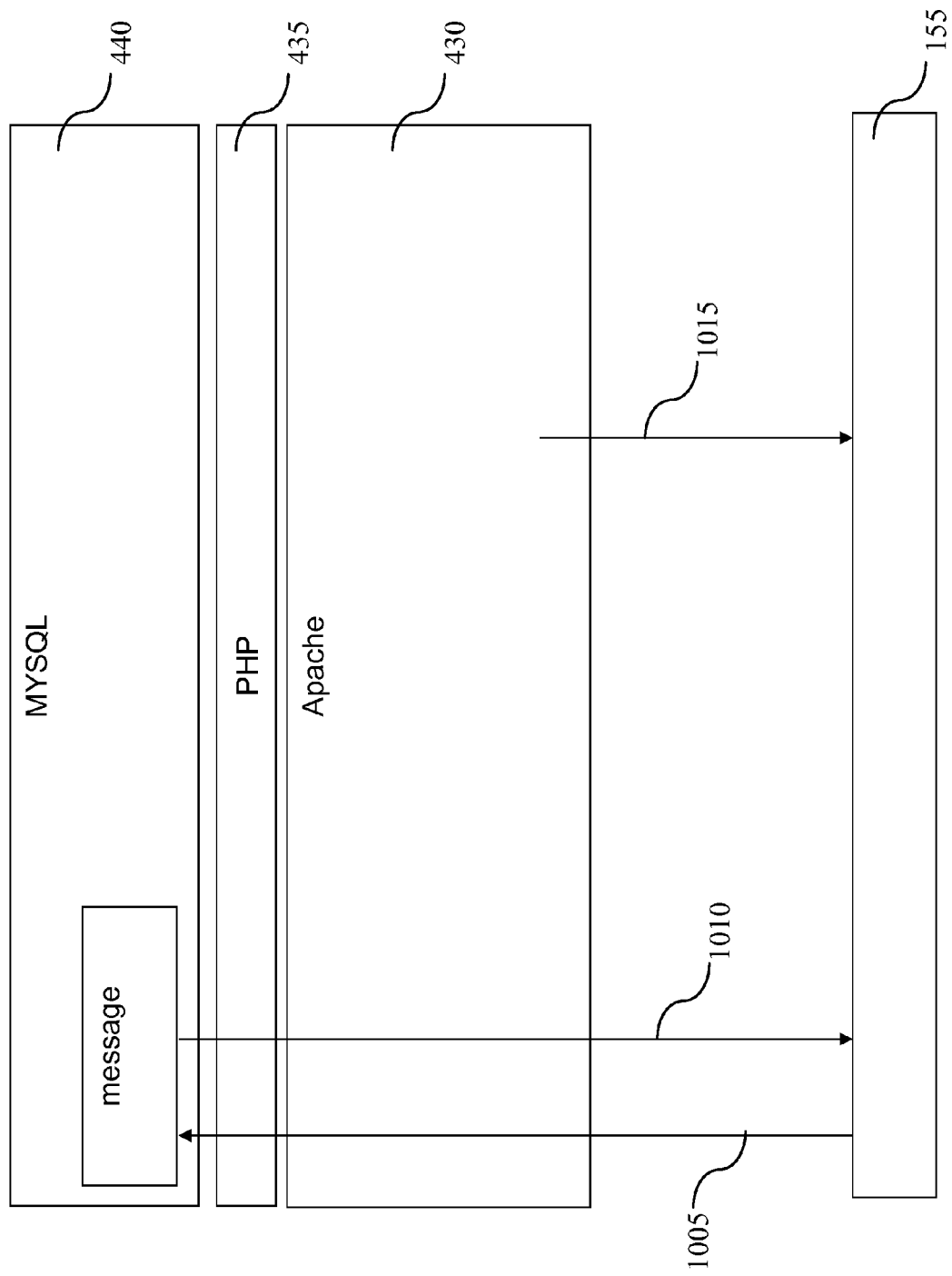

FIG. 10 illustrates steps or receiving a message by the unit 105. In an exchange of messages 1005, the unit 105 sends a choice of messages to the server 440 using the servers 430 and 435. In an exchange of messages 1010, the unit 105 retrieves an URL electronic address of the message. In an exchange of messages 1015, the unit 105 reads the video message in real time ("streams").

When a message is sent to the user of the unit 105, a specific screen appears on the television, together with a tone emitted by the loudspeaker 133.

To access the message, the uses presses a key on the remote control, which is associated by its color with a "start reading" message displayed on the screen of the television 150.

Figure 3:
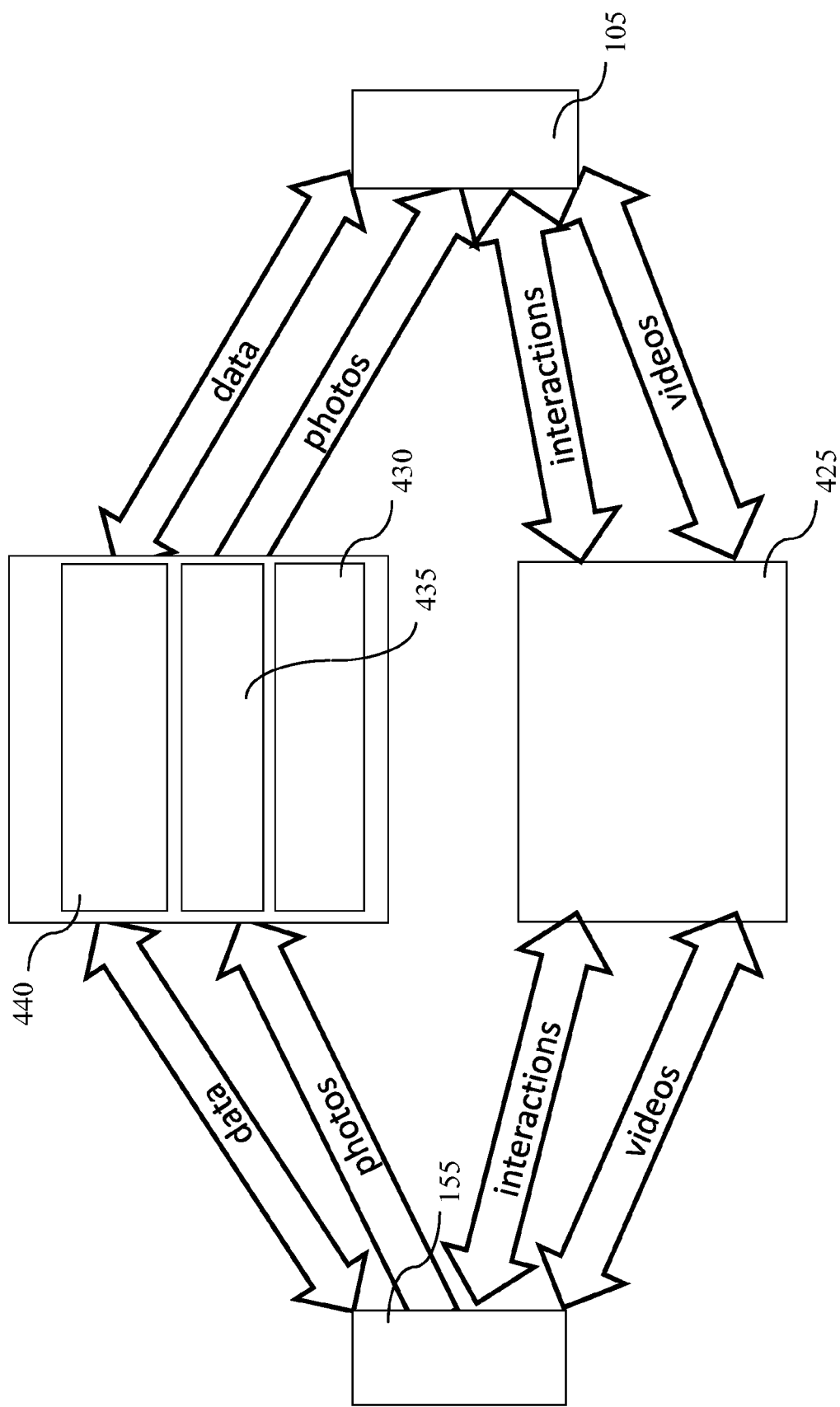
FIG. 3 is a functional diagram of servers utilized for communicating with a unit in embodiments of this invention.

As illustrated in FIG. 3, the data and photos pass through the servers 430, 435 and 440, whereas the interactions such as the status of the users, actions between users, calls, messages, photos and video streams pass through the server 425.

As regards the latency issue, when too much data is sent, data transmission suffers from delays; consequently, if the video load is too large, delays occur even for audio. Preferably, latency is measured continuously and the video parameters are set depending on the latency. Preferably, the bandwidth is measured at the unit 105 and the video settings are deduced therefrom, before starting the communication, as illustrated in FIG. 5.

The user of the computer 155 can also share photos with the user of the unit 105. After this user selects this function, the photos sent from the computer 155 are displayed on the television connected to the unit 105. In the same way, text messages can be transmitted to the unit 105, to be displayed on the screen of the associated television.

To communicate photographs, the contact has a memory space on the server where they can organize them into "albums" (folders); preferably there is a limited number of albums and of photographs per album so as to limit memory consumption and also to simplify searching for photographs by either contact and to reduce the risk of becoming addicted to looking at photographs.

Figure 12:
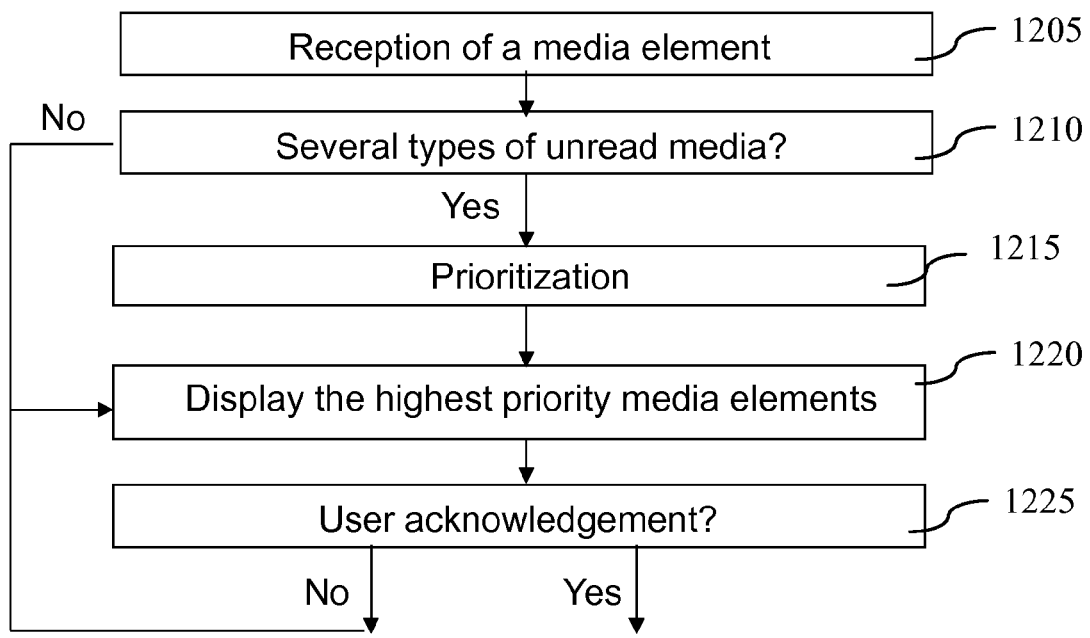
FIG. 12 represents, in the form of a logical diagram, steps utilized to transmit a media element to a unit's user.

Accordingly, in embodiments of this invention, a method of communicating between a sender communications system (the computer 155) and a receiver communications system (the unit 105) is implemented, which comprises:
- a step 1205 of receiving of receiving a media element (see FIG. 12);
- a step 1220 of displaying an item of information representing this media element on a screen associated with the receiver communications system; said display step concludes only upon a command from the user of the receiving communications system in a step 1225.

Each text message, photograph, video message and possibly link to a website or media element sent is thus automatically advised or displayed in the television of the user of the unit 105 until the user of the unit 105 acknowledges same.

In this way, recipients who, when they are recipients without an occupation, e.g. retired, are often waiting for messages cannot fail to be advised that a media element addressed to them has arrived.

In the cased of a plurality of messages, detected in a step 1210, priority is given to displaying video messages over displaying text media, then to displaying photo media, in a step 1215.

For the highest priority level, messages identifying them are displayed on the screen of the television 150 in a step 1220.

Preferably, the user of the computer 155 can insert hypertext links into the media elements, in particular within their text. By selecting one of these links, the user of the unit 105 accesses the associated content.

Preferably, the user of the computer 155 can insert the position of the mouse cursor (or of any other pointing device) in the media elements, in particular in media elements comprising images, in both real time communications and in messages left in the inbox.

The computer 155, the server 120 or the unit 105 are designed to assign this position to that of a cursor that is proportionally larger in the image displayed on the screen of the television 150 or to a "magnifier" that causes a portion of the displayed image to be enlarged. In this way, the remote contact can show and comment on a portion of the image.

To realize this "magnifier" function at the computer 155 or the server 120: the coordinates of the media element are detected (e.g. two opposite corners of the image); the coordinates of the mouse cursor are retrieved; the homothety factors representing the position of this cursor in a reference space linked to the image are determined. These coordinates relative to the image are transmitted to the unit 105. On its side, the unit 105 retrieves these coordinates as well as those of the image and performs a homothety to find the center of the magnifier. A zoom is then applied in a predefined area surrounding the center of the magnifier. A similar zoom is applied by the computer 150 to the image under consideration.

For transmitting links, for example, the API (Application Programming Interface) supplied by YouTube (registered trademark) at the following address is utilized: http://code.google.com/intl/fr/apis/youtube/overview.html.

A media element is then uploaded onto the server 120 or preferably access thereto is provided.

Figure 13:
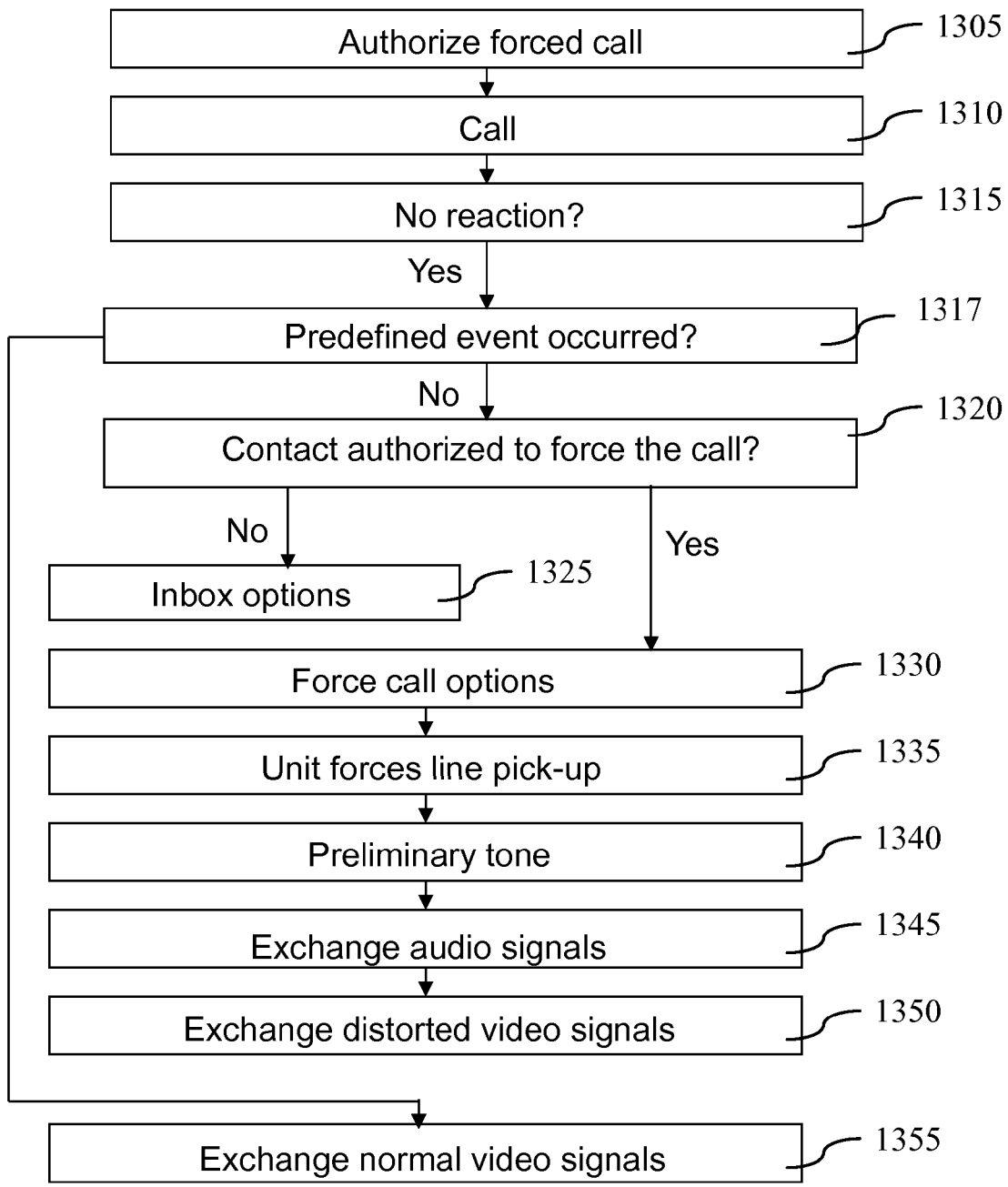
FIG. 13 illustrates, in the form of a logical diagram, steps utilized to force a unit to pick up a call.

In embodiments illustrated in FIG. 13, at least one contact is allowed to force the unit 105 to pick up the line to view the premises and/or the user for safety purposes, in cases where the user may be unconscious and for security of property purposes in case of absence.

To this end, the user of the unit 105 authorizes at least one contact to force the call pickup in a step 1305. When a contact makes a call to the unit 105, step 1310, it is determined whether the user of the unit 105 neither accepts nor rejects the call during a predefined length of time in a step 1315. If this is the case, it is determined whether the contact is authorized to force the call in a step 1320. If not, only the option of leaving a message is proposed to the contact in a step 1325. If so, it is proposed to the contact to "force the call", which corresponds to an automatic call pick-up mode in a step 1330. The contact can then trigger the call pick-up by the unit in a step 1335.

More generally, the method of instant communication between a plurality of sending communications systems (the computers 155) and the receiving communications system (the unit 105) comprises for at least one of said sending devices (a computer 155 with the rights to perform this):

a step 1310 of calling the receiving system by a sending system and in case there is no action by the user of the receiving system, a step 1335 of triggering the call pick-up of the receiving system by the sending system.

Preferably, this method comprises, beforehand, the step 1305 of authorizing the forced call, given by the user of the unit 105. In this case, only the computers 155 having this right will have the force call option proposed to them; the others will only have the option of leaving a message.

Preferably, in the case where the force call option is selected by the authorized contact, the following are provided, in succession:

a period of time during which a tone signals the call pick-up, step 1340;

a period of time during which only the audio signals are exchanged, step 1345; then a period of time during which the image captured by the camera 118 is transmitted, step 1350.

In embodiments, this image is degraded so as to respect the privacy of the user of the unit 105 (image blurred, pixelated, colors changed, sending the image of the outline of the captured image).

However, where a detector of discomfort, fall or other incident is provided, the option to force the call can be given to any contact and the image can be transmitted immediately (removing the tone and audio signal exchange periods) without distortion as soon as a discomfort, fall or other incident is detected. Step 1320 is preceded by a step 1317 of determining whether a predefined event is detected by the unit 105 and if so, a step of normal video exchanges is automatically triggered.

In addition, where a detector of discomfort, fall or other incident is provided, the unit 105 can cause at least one predefined contact to be called as soon as discomfort, a fall or other incident is detected.

It can be seen that detecting a fall can be performed by processing images, accelerometer signals or another sensor carried by the user, or voice signals or by detecting a prolonged pressing of any button on the remote control.

Preferably, the duration of a communication is limited to a predefined period of time (three hours, for example) to reduce bandwidth consumption.

It is noted that preferably, all these functionalities are realized from a website and a Flash interface.

a) Photos

The photos are sent via a PHP script that makes it possible to upload them onto the Apache2 server. The recordings of the photos are inserted in the database's photos table. The FMS server notifies the photos' recipient to tell them they have received some.

b) Video Messages

The video messages are recorded via the FMS server; once the stream has been recorded, a PHP script inserts the message in the database and the FMS server notifies the recipient who displays the message.

c) Written Messages

Written messages are sent via the FLS server.

d) Games

Games data is stored in XML files on the Apache2 server.

e) Videoconferencing

To make a call, an authenticated calling party issues a "call" (request) to the FMS server, which checks whether the called party is in the contacts list, then, if this check is positive, it issues a "call" to the called party. The called party receives an event. If the called party accepts the call, a response is sent to the calling party via the FMS server. Then, the FMS server is responsible for managing the image stream.

The operating principle of the unit 105 is identical for the additional modules, whether they are for remote monitoring or medical purposes. The unit 105 is fitted with sensors that send log entries to a monitoring server (see FIG. 12). This server uses a routine to analyze the log entries as they arrive.

Where there are "abnormal" values, the monitoring server triggers an alarm to a call center of advisors who contact the user of the unit 105. Depending on the type of result, the call center may decide to make its call using forced call pick-up. The calls are made by the call center via a SIP channel.

Figure 14:
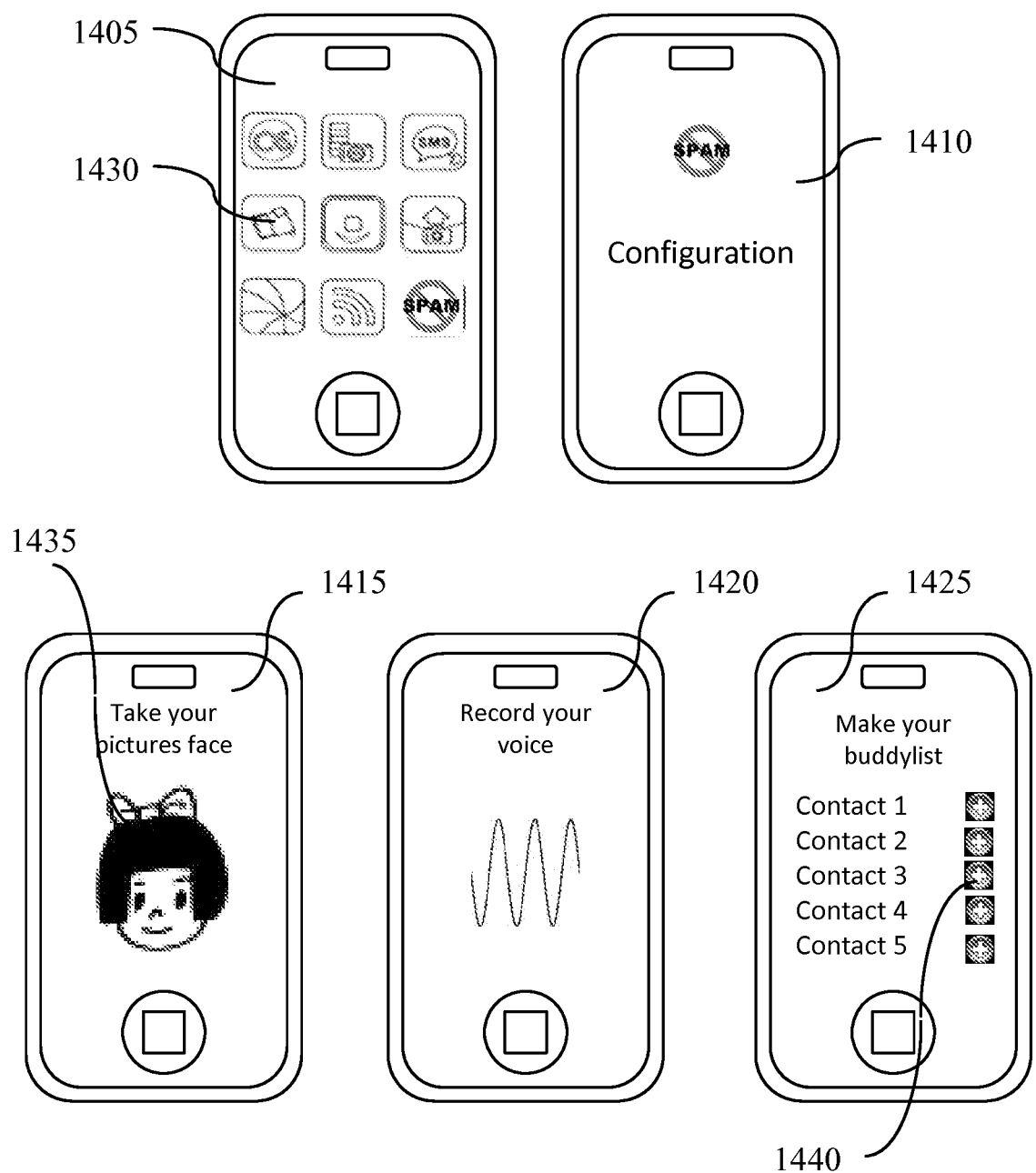
FIG. 14 represents, schematically, user interfaces for smartphones (or smart telephones with image display) for a called party to supply an undistorted media element representing a physical characteristic of the user.

FIG. 14 shows user interfaces 1405 to 1425 for smartphones, for a called party to supply an undistorted media element representing an undistorted physical characteristic of the user; The interface 1405 is displayed to the user, who is "the called party", when they subscribe to the implementation service of this invention. Using the interface 1405, the user selects an icon 1430 that represents the service under consideration. The interface 1410 is then displayed and indicates that the user will realize the configuration of the service. The next interface, 1415, prompts the user to take a photo of their face with the still camera built into the smartphone, then shows them the photo taken so that the user validates it as an undistorted media element making it possible for calling parties who know them to recognize them. The user may make as many consecutive attempts as they wish until they validate this visual media element. Once this media element has been validated, the next interface, 1420, prompts the user to record a message with their voice, then lets them hear the recorded message so that the user can validate it as an undistorted media element that allows calling parties who know them to recognize them. The user may make as many consecutive attempts as they wish until they validate this audio media element.

Once the media elements that allow them to be recognized have been validated, the user views the interface 1425 that allows them to indicate the identifiers of calling parties who are authorized without prior recognition or who are never authorized and therefore do not benefit from prior recognition and/or access to the inbox. These identifiers may be telephone numbers, e-mail addresses, for example.

In this way, the "called" subscriber runs a "called party biometrics" app with their smartphone. In a variant, the visual media element can be a video sequence.

In this way, the user destined to be called performs a step of configuring security by the called party, by means of a website or a dedicated application. From their service configuration interface, the called party can authorize all or some of the contacts stored in their mobile phone, in their computer or on an operator's server.

FIG. 15 shows user interfaces 1515 and 1520 for computers, residential gateways (able to display on a television screen) and public terminals for a called party to supply a visual media element by taking a photo with an external still camera or with a webcam and an audio media element, with the microphone built into the system, that represent an undistorted physical characteristic of the "called" user. In the same way as illustrated in FIG. 14, the user can also import or enter identifiers or contact details of persons who are authorized to communicate with them without verification of physical recognition of the called party.

Figure 16:
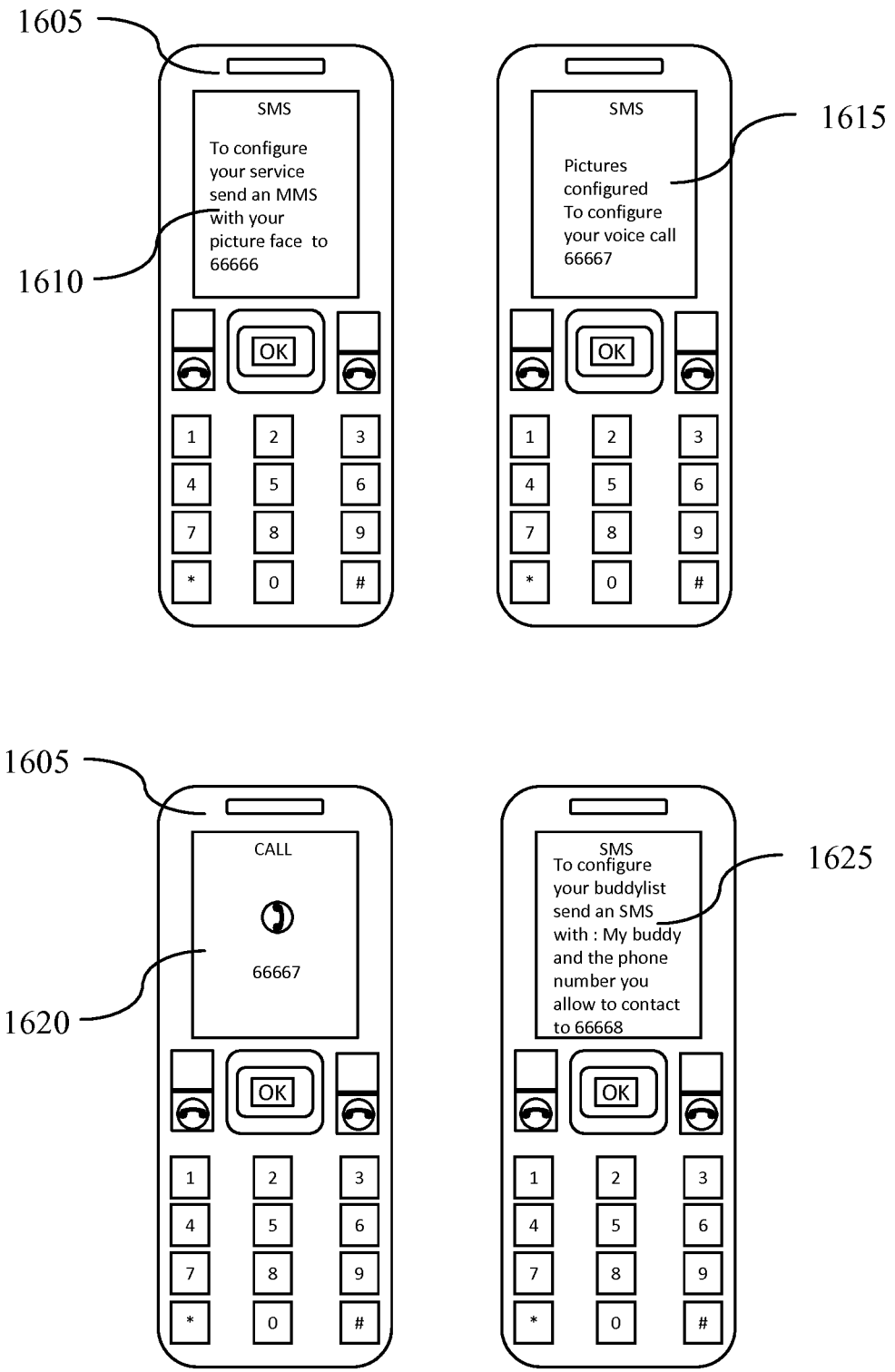
FIG. 16 represents, schematically, interfaces for telephones and smartphones for a user to configure a service for implementing this invention.

FIG. 16 shows interfaces 1610 to 1625 for telephones or smartphones 1605 for a user to provide parameter values to the service. With the interface 1610, the user is prompted to take their photo with the still camera built into the telephone and to send it by MMS (Multimedia Messaging Service message) to a predefined telephone number (66667, here). The interface 1615 confirms the configuration is correct. With the interface 1620, the user is prompted to record their voice with the microphone built into the mobile phone, then to send it to a predefined telephone number. With the interface 1625, the user is prompted to send identifiers of contacts who will not use the recognition service or of those who will have to use it.

In each of the embodiments described, in particular with regard to FIGS. 14 to 16, preferably:
- at least one media element is a fixed image, undistorted following said image's capture, said image representing the called party's face and/or an object that is a regular part of their surroundings;
- at least one said media element is a video sequence, undistorted following said sequence's capture, said sequence representing the called party's face and/or an object that is a regular part of their surroundings; and/or
- at least one said media element is an audio media element representing the called party's voice, undistorted following the capture of said voice.

It is noted that the term "undistorted" does not take into account distortion due to digitizing or compression of the media element's data or to its restitution on the calling means of the calling party.

In FIGS. 14 to 16, the case in which the user provides only one media element of each type, visual and audio, is envisaged. Preferably, however, the called party is asked to provide a plurality of media elements of each type so as to vary the media element presented to the calling party between consecutive calls, in particular in case of failure to recognize after three attempts at recognition (see FIG. 18). To simplify, in respect of FIGS. 17 to 19, it is only envisaged that the called party has only supplied one media element of each type.

Figure 17:
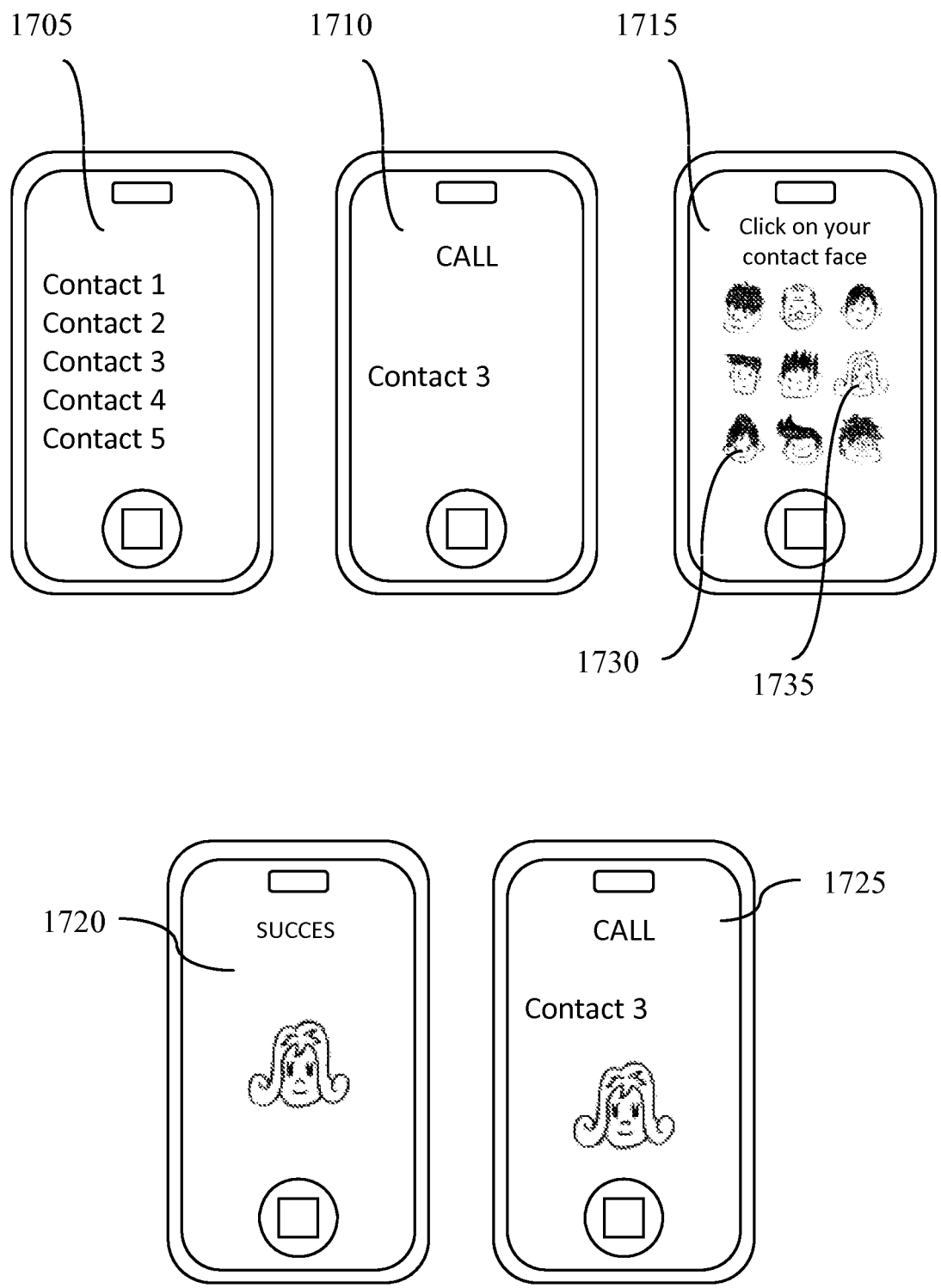
FIG. 17 represents, schematically, interfaces for a calling party to visually recognize a called party.
Figure 19:
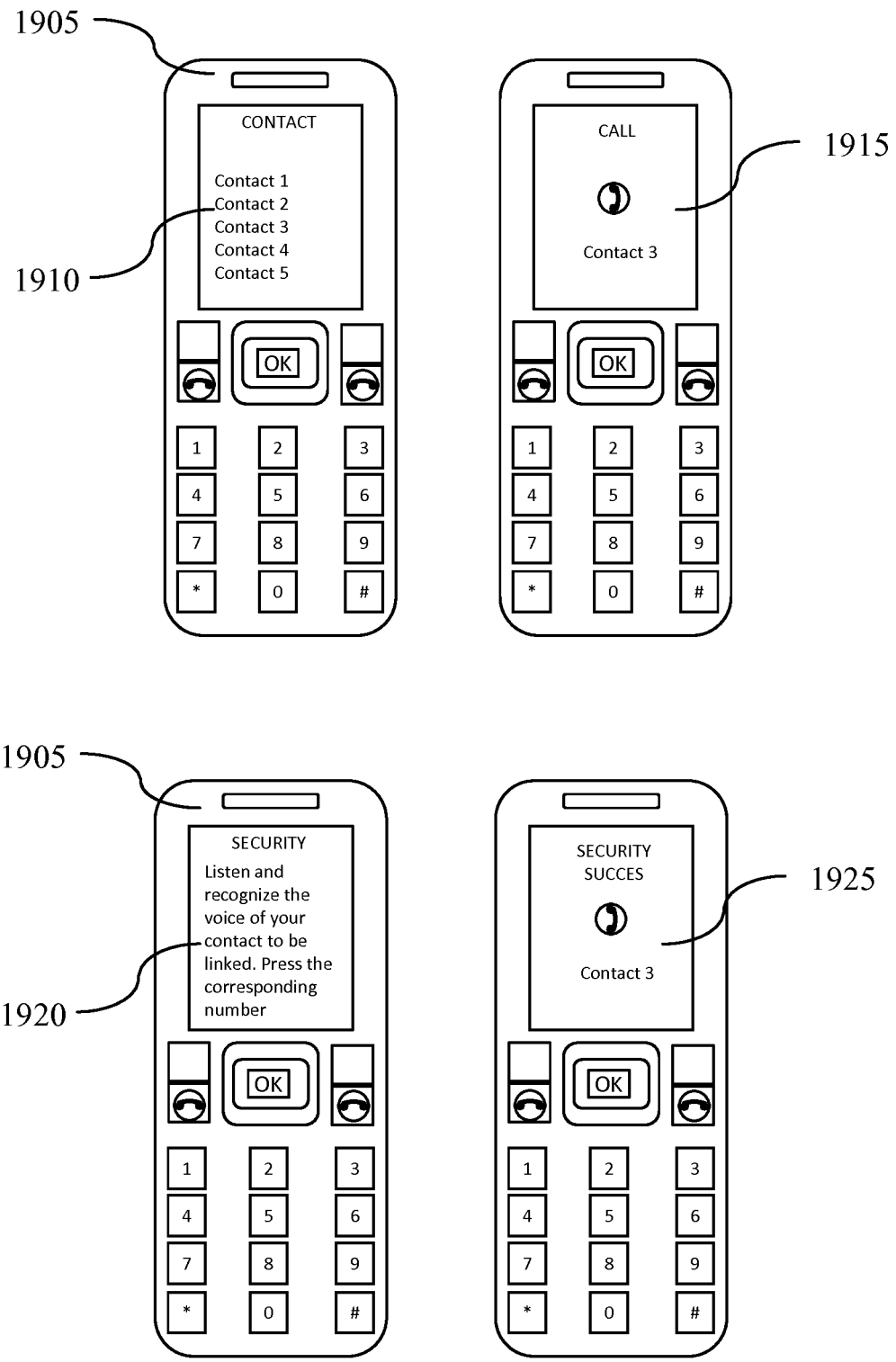
FIG. 19 represents, schematically, interfaces for a calling party to aurally recognize a called party.

FIGS. 17 to 19 represent interfaces likely to be seen by the calling party when they try to contact the called party by telephone. At interface 1705, the calling party chooses a contact. After selecting, contact no. 3 here, the user makes the call. In response, the recognition service sends them nine images 1730 that represent undistorted faces, one of which, 1735, is the photograph provided by the called party; the other media elements of this plurality have a similar form to that of the media element representing the called party. For example, if media element 1735 is an undistorted media element, other media elements (preferably all the other media elements) are also undistorted. If media element 1735 is a color photograph, preferably, so are the others.

The interface 1715 prompts the calling party to select, for example with a touch-screen, a pointing device built into a keyboard or the keys on a keyboard, the photograph of the called party. If the user selects the photograph 1735, the interface 1720 indicates to them that the choice is correct, then the interface 1725 indicates that the call is in progress in known manner, with the called party's phone ringing.

FIG. 18 shows that, in case of failure to recognize, interface 1805, two new attempts are authorized (the number of three attempts can be parameterized in factory settings or by the called party), interfaces 1810 and 1815. After three failures, interface 1820 is displayed to the calling party and comprises an indication 1825 of the possibility of recording a message and an indication of the possibility of stopping. After three failures, the calling party is not authorized to try again to call the same called party's number for at least a predefined period of time, e.g. six hours.

There are several possible variants for configuring interface 1715, which appears at the time of a renewed attempt to call the called party:
- in variants, the same photographs are displayed as at the time of the previous attempt. In this way, the calling party is prevented from spotting the only photograph that didn't change from one attempt to the next, which would have to be that of the called party.
- in variants, only those photographs which the calling party had already selected at the time of previous attempts are replaced. This consequently prevents the calling party from gradually learning the correct response by remembering the photos previously selected and
- in variants, where the called party has provided several photographs, their photograph will be changed, as well as all or part of the other photographs.

FIG. 19 illustrates the case of telephones 1905 that cannot display photographs. In this case, after an interface 1910 allows the calling party to select a called party number and an interface 1915 for placing the call, interface 1920 prompts the calling party to listen to a plurality of voice messages, one of which is a message left by the called party and which the calling party must recognize by selecting its number in the message sequence by entering this number on the keyboard. In case of success, interface 1925 indicates that the call will continue in known manner. In case of failure, as indicated above for visual media elements, the calling party can make further attempts if the service settings allow it. Once the maximum number of attempts has been reached without the calling party having recognized the called party's voice, the calling party may leave a message in the called party's inbox and is then not authorized, at least for a predefined time period, to call the called party.

As a variant, when the calling party has failed to recognize the called party visually over several attempts and has consequently had to wait for a predefined period before trying again to call the called party, the calling party will be asked to recognize the called party using the audio media element on the subsequent attempt. In this way, the calling parties cannot learn anything from their previous call attempt and the called party's security against unsolicited calls is reinforced.

Figure 20:
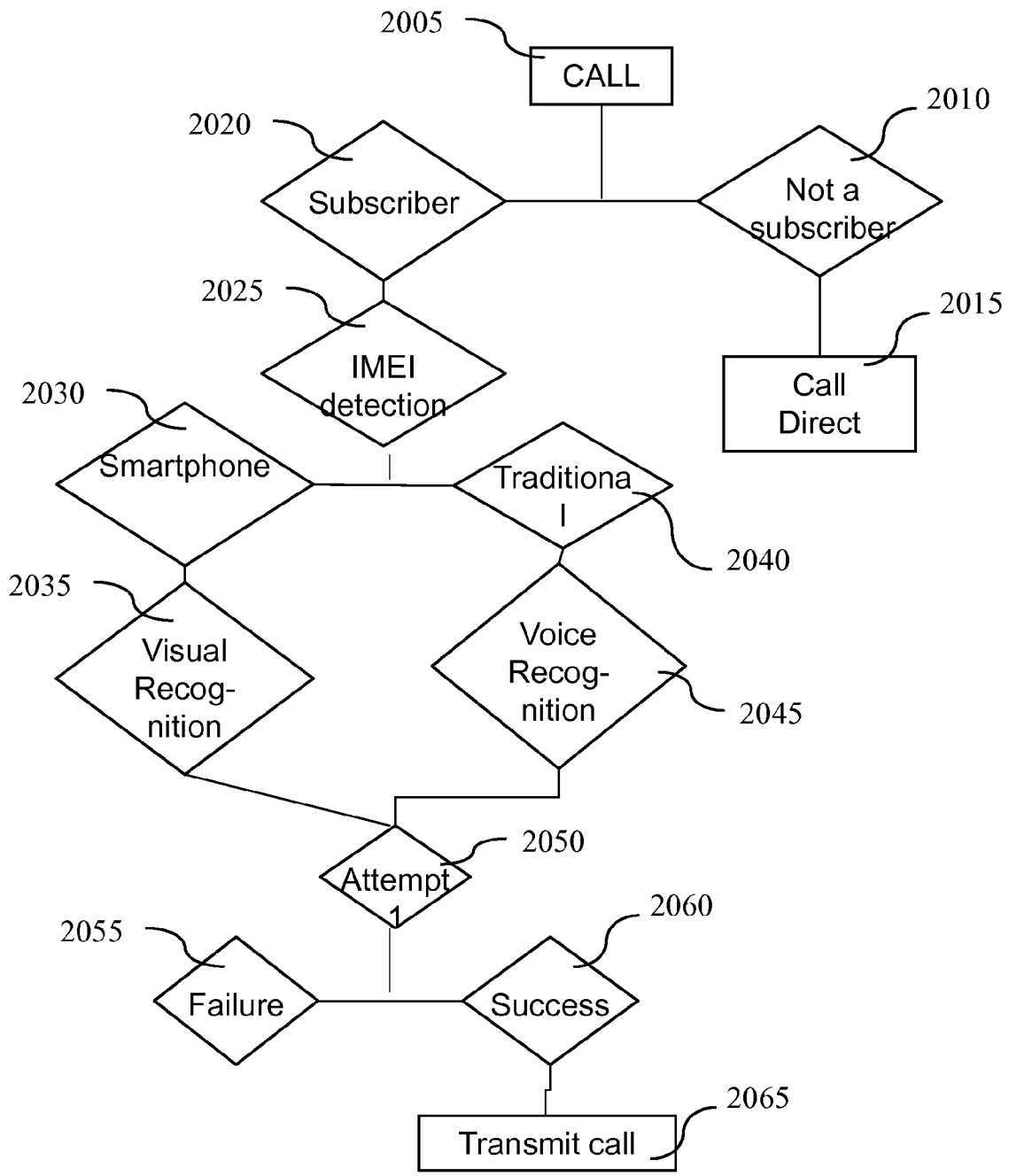
FIGS. 20 and 21 represent, in the form of a logical diagram, steps utilized in a particular embodiment of the method that is the subject of this invention.
Figure 21:
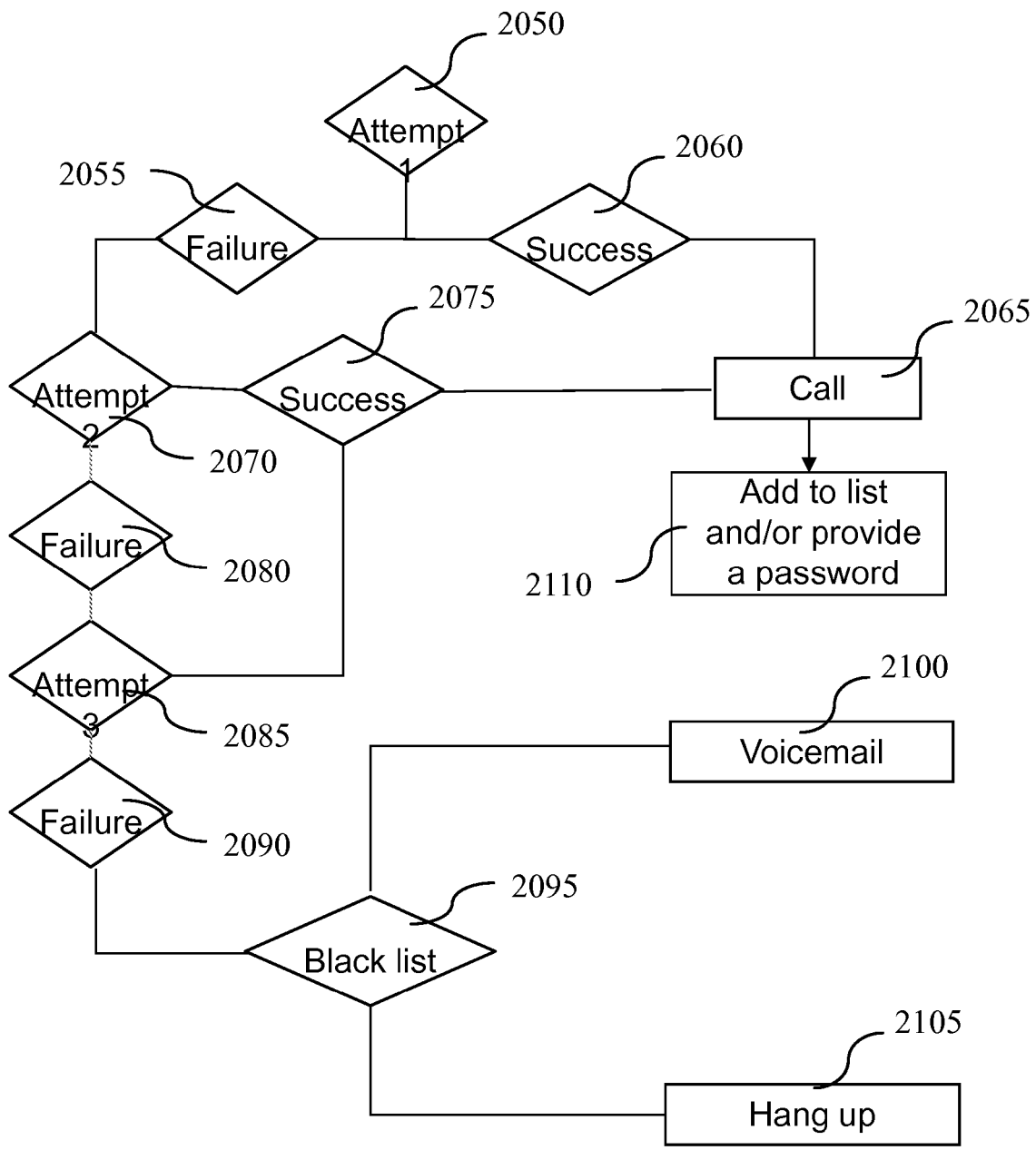

As illustrated in FIGS. 20 and 21, for the calling party, it is firstly detected in a step 2005 that they are making a call. If the called party's number does not match that of the service for preliminary recognition of the called party by the calling party, detected in a step 2010, the call continues is a manner known to the prior state of the art in a step 2015. The called party's telecommunications operator performs the detection of the subscription to the service.

In a variant, a dedicated application installed in the called party's telephone performs all the steps described below.

If the called party's number matches the service for preliminary recognition of the called party by the calling party, which is detected in a step 2020, the type of phone used by the calling party is determined, depending on their telephone's IMEI in a step 2025. The IMEI (International Mobile Equipment Identity) is a number that makes it possible to uniquely identify each of the mobile telephony terminals. This IMEI number allows the network operator to identify the calling mobile phone and consequently to authorize its connection or not. In this way it allows emergency calls to be made without a SIM card in certain countries (e.g. the European emergency number 112). Its best-known use is to be able to block a stolen mobile phone (gray list, black list) with all the operators that have subscribed to the database of IMEI numbers. By default, in particular if the IMEI is not available, for example in the case of a call from a fixed line, either the calling party is given the choice of visual recognition or audio recognition by sending them a text message, or it is considered that the telephone cannot display visual media elements.

If the system used by the calling party cannot display visual media elements, step 2040, audio recognition is called up, step 2045, and the steps explained with regard to interfaces 1910 to 1925 are performed in steps 2050 et seq (FIGS. 20 and 21).

If the system used by the calling party can display visual media elements, step 2030, visual recognition is called up, step 2035, and the steps explained with regard to interfaces 1705 to 1820 are performed in steps 2050 et seq.

In a step 2050, the calling party is shown several media elements, including one media element provided by the called party, and one waits for them to select one of these media elements. It is noted that the media elements that are not the one provided by the called party can be selected randomly from the media elements provided by all the users and/or from media provided by models, either voluntarily or in return for payment.

If this media element is the one provided by the called party, step 2060, in a step 2065, the call proceeds in a manner known in the prior art. Else, after the failure 2055, a second attempt is performed, steps 2070 (presentation of the media elements and selection of one media element), 2075 (success) and 2080 (failure), similar to the first. In the case of another failure, step 2080, a third attempt is performed, steps 2085 (presentation of the media elements and selection of one media element), 2075 (success) and 2090 (failure), similar to the first. Following the third failure, step 2090, it is determined whether the user is on a denied access list given by the called party during the initial configuration. If so, the call is terminated in step 2105. Else, in a step 2100, the calling party accesses the voice or video inbox of the called party.

When a calling party has successfully gained access to the called party, the latter can provide for the identifier of the calling party's telephone to be automatically entered, in a step 2110, in the list of authorized numbers, except if they modify the service's operating parameters. In this way, the calling party who may be an acquaintance of the called party but who may have been forgotten in the list of authorized persons would be automatically added to this list after having recognized the called party by one of their physical characteristics. In a variant, in step 2110, a password is provided to the calling party in voice form and this password allows the calling party to make a call without prior recognition of the called party.

In the same manner, in a variant, the method utilizes an automatic step, after the called party has listened to or viewed each message left by a calling party in a step 2100, for requesting this calling party to be accepted into the list of authorized persons. In this way, a person to whom the called party has left their telephone number without the calling party memorizing their physical characteristics could later have the obligation of recognizing the called party lifted.

The method also comprises in a variant, adding all the telephone numbers dialed by the user identified as "called party" (even if, in this step in particular, they are the one who calls the other user). In this way, when the user identified as the "called party" has called or tried to call a contact, that contact is automatically authorized to call them back with prior recognition of a physical characteristic of the calling party.

Of course, the called party can at any time reconfigure the service to withdraw an authorization from another user or even to place them in a list of rejected calls.

It is noted that implementing this invention also limits calls dialed in error when a telephone keyboard is not locked.

It is noted that, in embodiments, what has been described above in regards of the called party's physical characteristics can be extended to the physical characteristics of a personal object belonging to the called party or to a dwelling or work premises of the called party. In this way, the called party may be prompted to take a photograph of an object of their surroundings that is easily recognizable by their relatives, their place of work, a room in their home or the outside appearance of their home. None of these physical characteristics require any specific personal memorizing; they are automatically recognized by the called party's visitors.

Everything that has been described above in the case of telephone calls also applies to the case of e-mails, where attempting to send an e-mail to a recipient is equivalent to attempting to make a telephone call to a called party. Consequently, when this invention is implemented on an e-mail transmission service, the sending user must recognize a media element representing a physical characteristic of the recipient for this e-mail to be transmitted to the recipient.

Accordingly, in embodiments, the calling party requests to perform a message transmission to a called party, for example, in the form of being put in communication by telephone. The calling party is then shown a plurality of media elements, one of which represents a physical characteristic of the called party or of an object that is a regular part of their surroundings, where other media elements of this plurality of media elements are similar in form to the media element representative of the called party. After the calling party has selected an audiovisual media element from the media elements presented, it is determined if that media element is the one that is representative of the called party. The transmission of the message from the calling party to the called party is only authorized if this is the case.

In embodiments, if the media element selected by the calling party represents the called party, a password is supplied to the calling party. And each subsequent step of requesting a message to be transmitted comprises a step of requesting a password from the calling party; the presentation step is only performed if the calling party does not supply the expected password.

In embodiments, if the media element selected by the calling party is representative of the called party, an identifier, e.g. a telephone number, of the calling party over a network that connects the calling party and the called party is stored; the calling party can then make calls to the called party by utilizing said unique address, without the presentation and selection steps being utilized.

In embodiments, each unique address used by the called party to contact another user is stored; the calling party can then make calls to the called party by utilizing said unique address without having the presentation and selection steps being utilized.

In embodiments:
- at least one media element is a fixed image, undistorted following said image's capture, said image representing the called party's face and/or an object that is a regular part of their surroundings;
- at least one said media element is a video sequence, undistorted following said sequence's capture, said sequence representing the called party's face and/or an object that is a regular part of their surroundings; and/or
- at least one said media element is an audio media element representing the called party's voice, undistorted following the capture of said voice.

In embodiments, a plurality of media elements representing the called party are stored in memory and, during the presentation step, if the calling party has not selected the media element representing the called party in the previous message transmission request, the media element representing the called party is a different media element from that presented to the calling party at the time of the previous message transmission request.

The server that implements the steps of prior recognition of the called party by the calling party constitutes a device for authorizing and transmitting a message, which comprises:
- a means of receiving a request to transmit a message, from a calling party to a called party, e.g. calls over a telephone network;
- a means of transmitting a plurality of media elements to the calling party, one of which is representative of a physical characteristic of the called party, where the other media elements in this plurality of media elements are similar in form to the media element representative of the called party;
- a means of receiving a selection made by the calling party of an audiovisual media element from the transmitted media elements, e.g. in the form of DTMF signals representing a keyboard key pressed by the calling party or an item of information transmitted by the calling party's telephone to represent an image selected on a touchscreen of this telephone and
- a means of transmitting the message from the calling party, only where the selected media element is representative of the called party, e.g. by putting the calling party through to the called party's telephone.

The invention claimed is:

1. A method of authorizing a transmission of a message, comprising the steps of:
   selecting an identifier of a called party by a calling party using a user device;
   requesting the transmission of the message to a processing unit associated with the called party over a communications network by the calling party using the user device;
   verifying by a server that the calling party is able to recognize the called party from one of a plurality of identifiers selected by the called party;
   presenting by the server a plurality of audiovisual media elements on the user device of the calling party, one of the plurality of audiovisual media elements being representative of a physical characteristic of the called party, other audiovisual media elements of the plurality of audiovisual media elements being similar in form to the audiovisual media element representative of the called party;
   selecting one audiovisual media element from the presented audiovisual media elements on the user device by the calling party;
   authorizing by the server the transmission of the message to the processing unit of the called party from the user device of the calling party when the selected audiovisual media element is representative of the called party; and
   denying by the server the request to transmit the message to the processing unit of the called party from the user device of the calling party when the selected audiovisual media element is not representative of the called party.

2. The method of claim 1, further comprising the steps of requesting by the server a password from the calling party for verification by the server; performing the steps of presenting and selecting when the calling party does not provide a correct password; and skipping the steps of presenting and selecting when the calling party provides the correct password.

3. The method of claim 1, further comprising the step of providing by the server a password to the user device of the calling party over the communications network when the selected audiovisual media element is representative of the called party.

4. The method of claim 1, further comprising the steps of storing by the server of a unique identifier of the calling party to connect the user device of the calling party and the processing unit of the called party over the communications network when the selected audiovisual media element is representative of the called party; and utilizing the unique identifier by the calling party, without performing the steps of presenting and selecting, to makes calls to the called party.

5. The method of claim 4, further comprising the step of storing by the server each identifier utilized by the called party to call another user; and utilizing said each unique identifier by the calling party, without performing the steps of presenting and selecting, to makes calls to the called party.

6. The method of claim 1, further comprising the step of presenting at least one audiovisual media element which is a fixed image representing at least one of the called party's face or an object that is a regular part of the called party's surroundings, the fixed image being undistorted after its capture.

7. The method of claim 1, further comprising step of presenting at least one audiovisual media element which is a video sequence representing at least one of the called party's face or an object that is a regular part of the called party's surroundings, the video sequence being undistorted after its capture.

8. The method of claim 1, further comprising step of presenting at least one audiovisual media element which is an audio media element representing the called party's voice, the audio media element being undistorted after its capture.

9. The method of claim 1, further comprising the step of providing the selected audiovisual media element by the processing unit of the called party to the server.

10. The method of claim 1, further comprising the steps of storing a plurality of audiovisual media elements representing the called party in a memory, and presenting a different audiovisual media element representing the called party by the server when an audiovisual media element was not selected by the calling party in a previous message transmission request.

11. The method of claim 1, further comprising the step of randomly selecting by the server other audiovisual media elements from a database.

12. The method of claim 1, wherein the step of requesting the transmission of the message comprises the steps of: detecting an image display capability of the user device of the calling party; presenting the audiovisual media elements comprising at least one image when the user device of the calling party is capable of displaying images; presenting audio media elements when the user device of the calling party is not capable of displaying images.

13. The method of claim 12, wherein the step of detecting the image display capability utilizes an IMEI (International Mobile Equipment Identity) of the user device of the calling party.

14. The method of claim 1, further comprising the step of connecting the calling party to a voicemail of the called party by the server when the audiovisual media element representative of the called party is not selected by the calling party after a predefined number of consecutive attempts.

15. A system for authorizing a transmission of a message, comprising:
a processing unit associated with a called party;
a user device for selecting an identifier of a called party by a calling party and for requesting the transmission of a message to the processing unit of the called party over a communications network;
a server for verifying that the calling party is able to recognize the called party from one of a plurality of identifiers selected by the called party, for presenting a plurality of audiovisual media elements on the user device of the calling party, one of the plurality of audiovisual media elements being representative of a physical characteristic of the called party and other audiovisual media elements of the plurality of the audiovisual media elements being similar in form to the audiovisual media element representative of the called party;
wherein the user device receives one audiovisual media element selected by the calling party from the audiovisual media elements presented on the user device;
wherein the server authorizes the transmission of the message to the processing unit of the called party from the user device of the calling party when the selected audiovisual media element is representative of the called party; and
wherein the server denies the request to transmit the message to the processing unit of the called party from the user device of the calling party when the selected audiovisual media element is not representative of the called party.

16. The system of claim 15, wherein the user device requests a password from the calling party and transmits the password to the server for verification; and wherein the server presents the plurality of audiovisual media elements only when the calling party does not presents a correct password.

17. The system of claim 15, wherein the server provides a password to the user device of the calling party when the selected audiovisual media element is representative of the called party.

18. The system of claim 15, that further comprises a storage device for storing a unique identifier of the calling party to connect the user device of the calling party and the processing unit of the called party over the communications network when the selected audiovisual media element is representative of the called party; and wherein the server enables the calling party to make calls to the called party by using the unique identifier without selecting the audiovisual media element that is representative of the called party.

19. The system of claim 18, wherein the storage device stores each unique identifier used by the called party to call another user; and wherein the server enables the calling party to make calls to the called party by utilizing said each unique identifier without selecting the audiovisual media element that is representative of the called party.

20. The system of claim 15, wherein at least one audiovisual media element presented is a fixed image representing at least one of the called party's face or an object that is a regular part of the called party's surroundings, the fixed image being undistorted after its capture.

* * * * *